(12) United States Patent
Manone et al.

(10) Patent No.: US 10,676,295 B1
(45) Date of Patent: Jun. 9, 2020

(54) MONITORING AND ALERTING SYSTEMS FOR DETECTING HAZARDOUS CONDITIONS AT LOADING DOCKS

(71) Applicant: Rite-Hite Holding Corporation, Milwaukee, WI (US)

(72) Inventors: Joseph Manone, Milwaukee, WI (US); Matthew Sveum, Wauwatosa, WI (US)

(73) Assignee: RITE-HITE HOLDING CORPORATION, Milwaukee, WI (US)

(*) Notice: Subject to any disclaimer, the term of this patent is extended or adjusted under 35 U.S.C. 154(b) by 0 days.

(21) Appl. No.: 16/277,743

(22) Filed: Feb. 15, 2019

(51) Int. Cl.
*B65G 69/00* (2006.01)
(52) U.S. Cl.
CPC .................. *B65G 69/003* (2013.01)
(58) Field of Classification Search
CPC combination set(s) only.
See application file for complete search history.

(56) References Cited

U.S. PATENT DOCUMENTS

| 6,092,970 | A | 7/2000 | Hahn et al. | |
|---|---|---|---|---|
| 8,307,956 | B2* | 11/2012 | Andersen | B65G 69/005 188/36 |
| 8,464,846 | B2 | 6/2013 | Andersen et al. | |
| 8,465,245 | B2* | 6/2013 | Manone | B65G 69/005 188/32 |
| 8,590,673 | B2 | 11/2013 | Andersen et al. | |
| 9,010,501 | B2 | 4/2015 | Brooks et al. | |
| 9,126,775 | B2 | 9/2015 | Brooks et al. | |
| 9,139,384 | B2* | 9/2015 | Brooks, IV | B65G 69/005 |
| 2010/0260586 | A1* | 10/2010 | Manone | B65G 69/005 414/401 |
| 2014/0166950 | A1 | 6/2014 | Wiegel et al. | |

* cited by examiner

*Primary Examiner* — Travis R Hunnings
(74) *Attorney, Agent, or Firm* — Hanley, Flight & Zimmerman, LLC

(57) ABSTRACT

Monitoring and alerting systems for detecting hazardous conditions at loading docks are disclosed. An example monitoring and alerting system includes a first sensor system to monitor a location of a first brace of a first dock station of the loading dock. The first brace being positionable in a first stored position, a first operative position, and a first transition position, where the first transition position is between the first stored position and the first operative position. A second sensor system is to monitor a location of a second brace of a second dock station of the loading dock adjacent the first dock station. The second brace is positionable in a second stored position, a second operative position, and a second transition position, where the second transition position is between the second stored position and the second operative position. A first signaling device at the first dock station is responsive to outputs of the first sensor system and the second sensor system. A second signaling device at the second dock station is responsive to outputs of the first sensor system and the second sensor system.

25 Claims, 24 Drawing Sheets

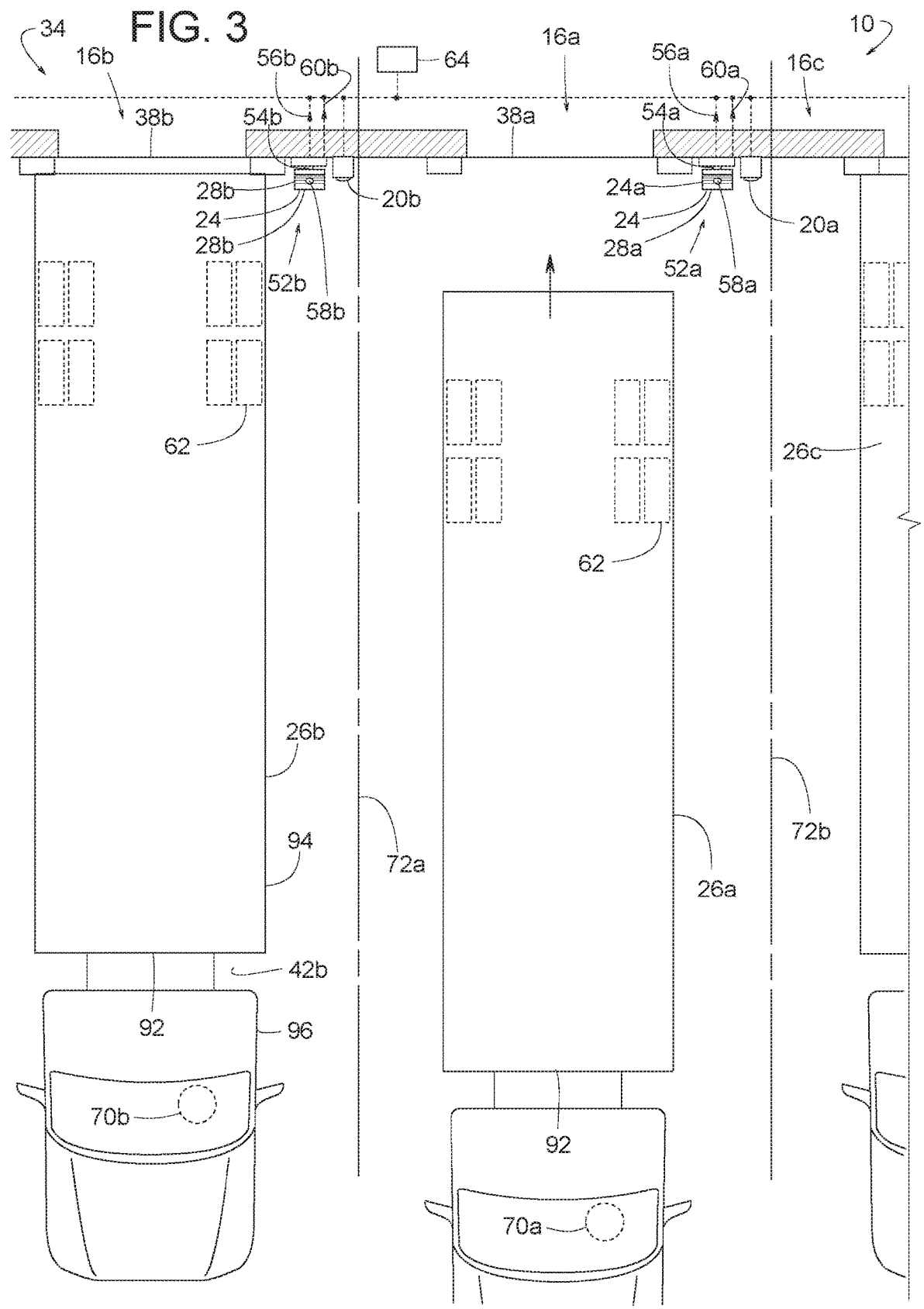

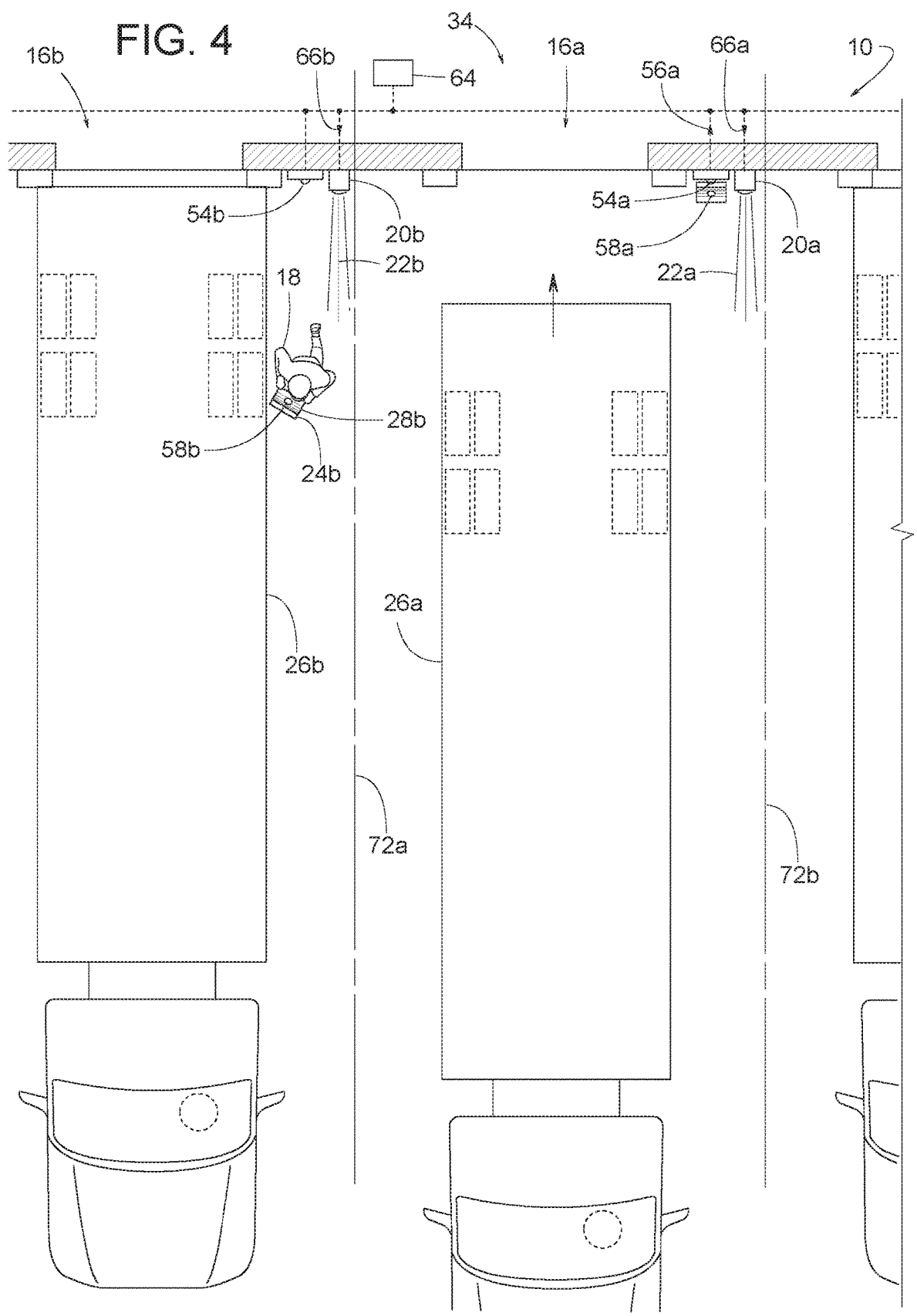

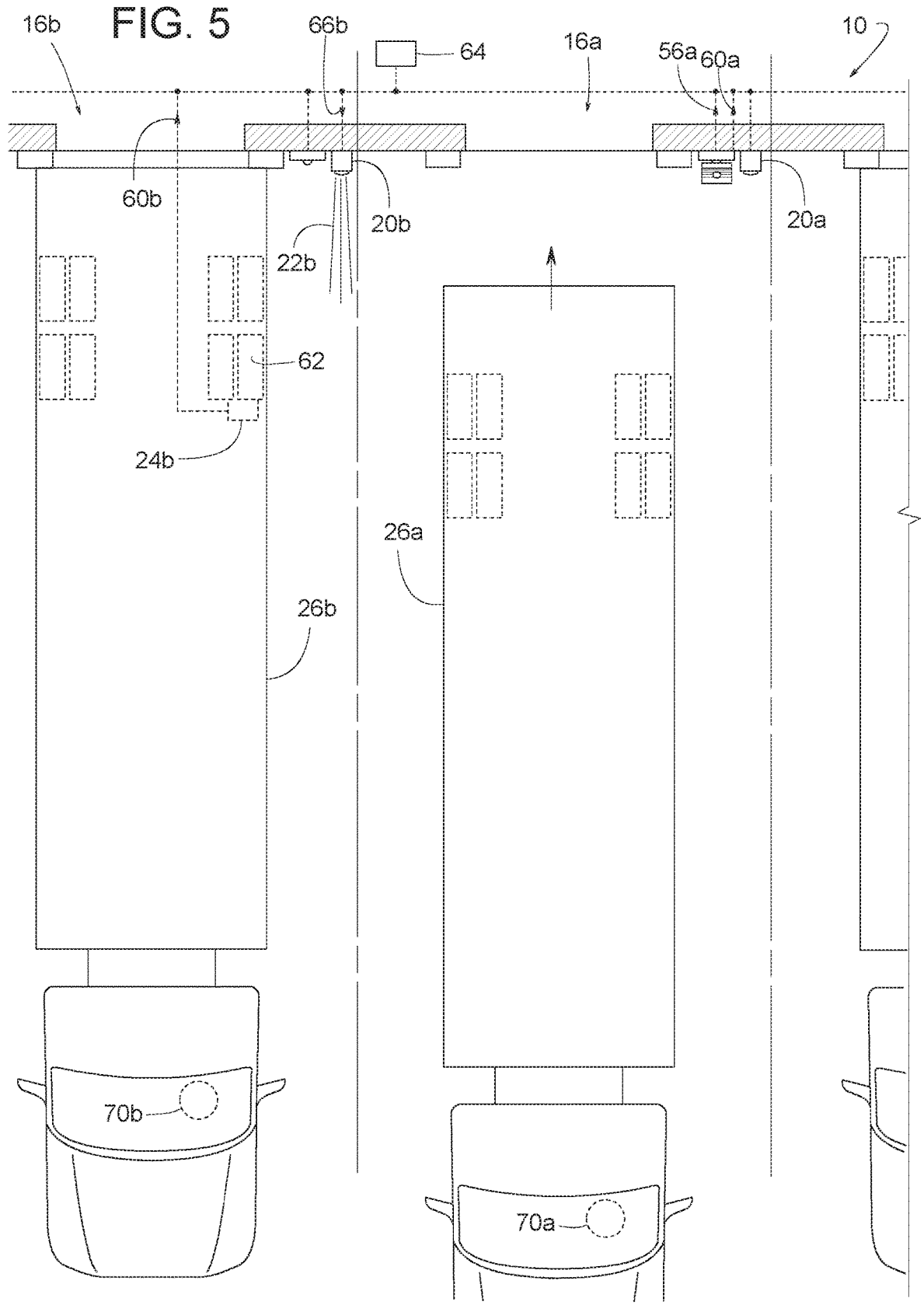

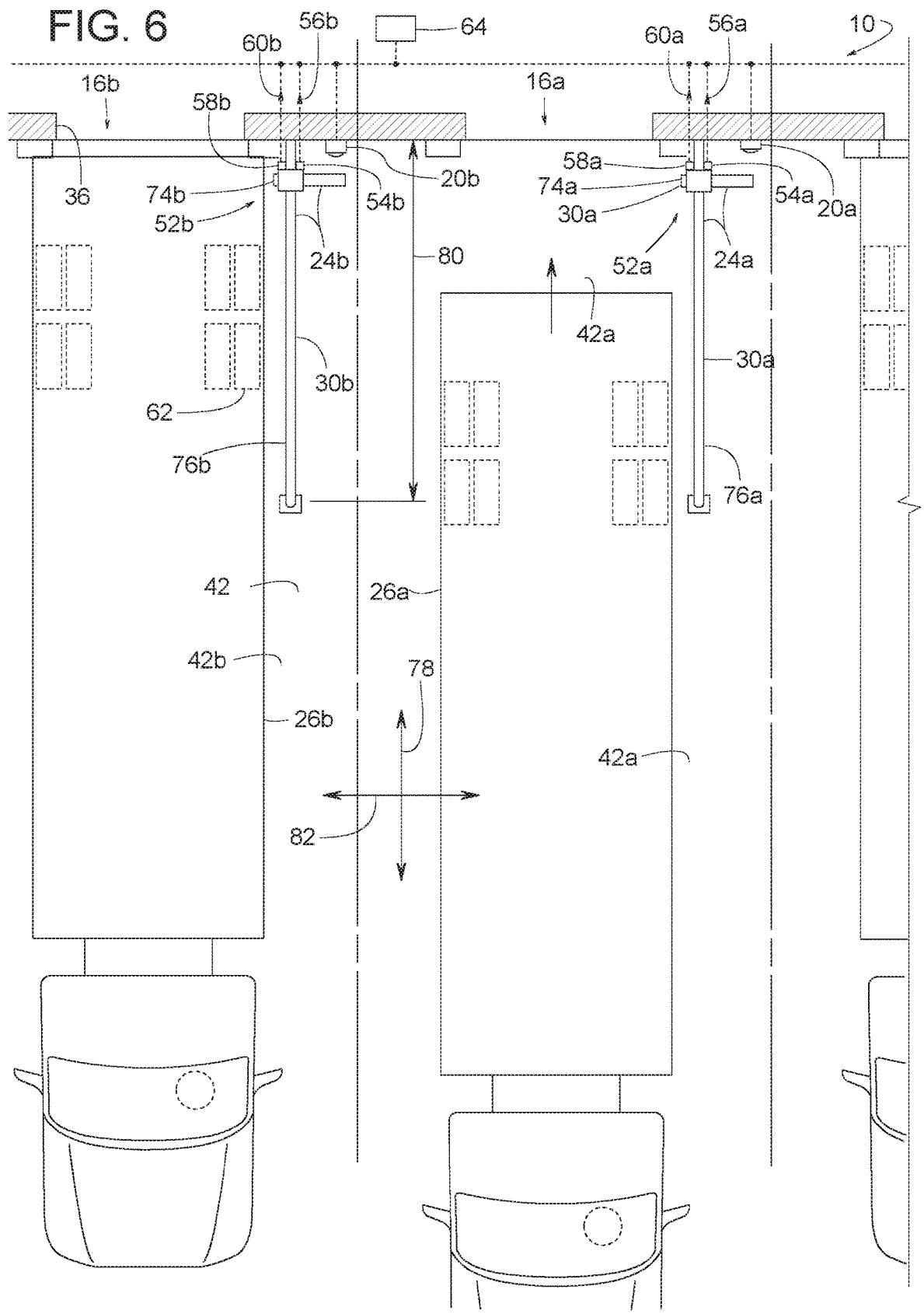

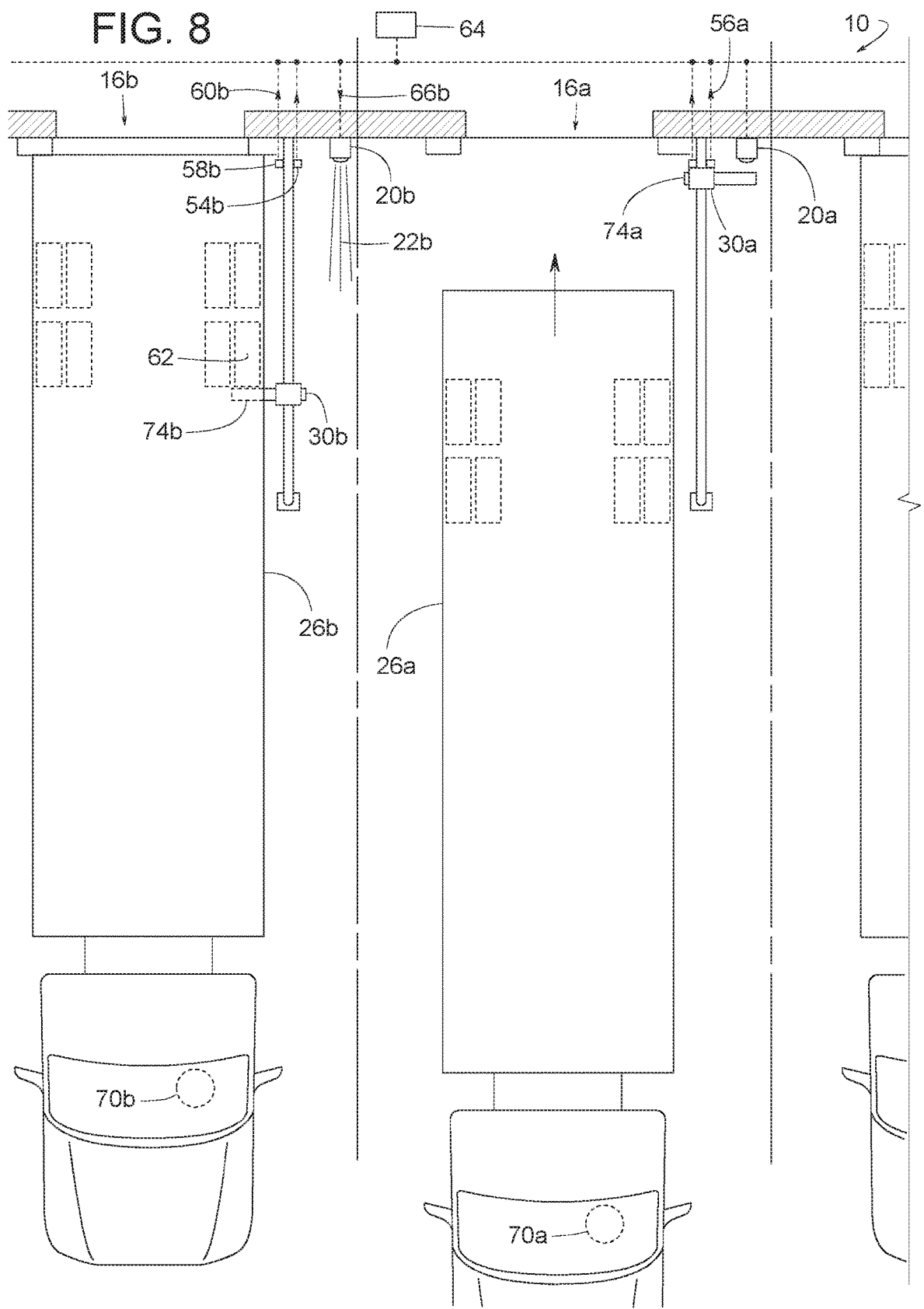

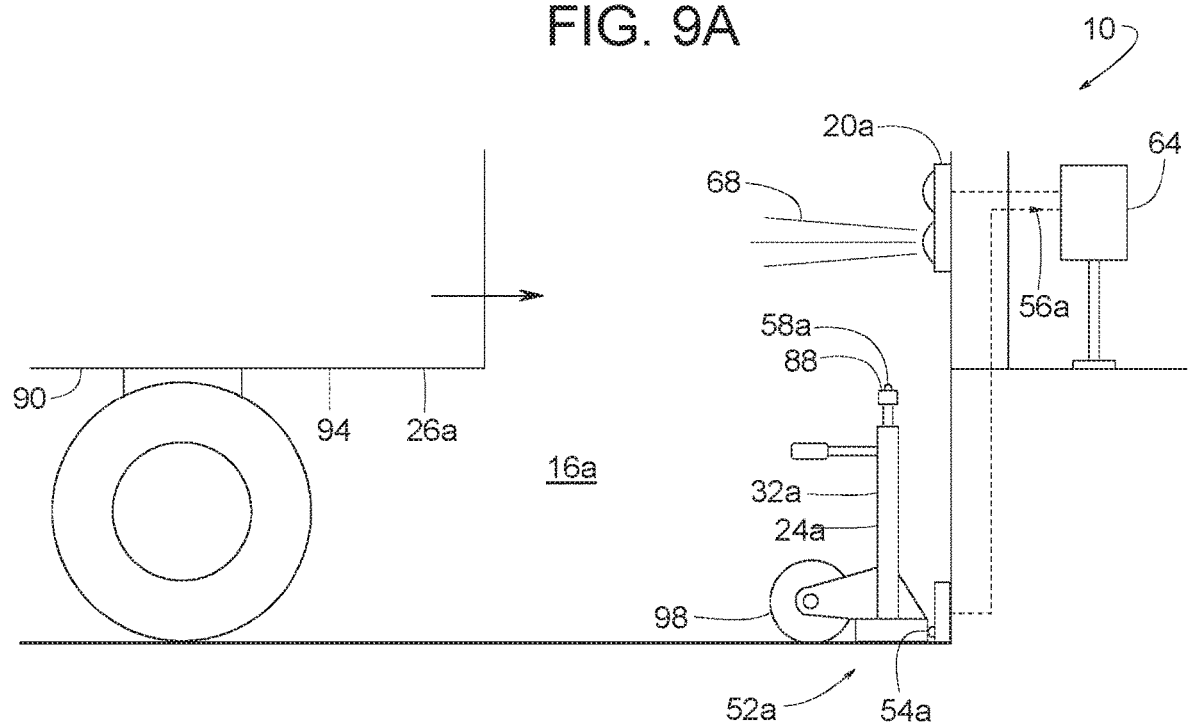
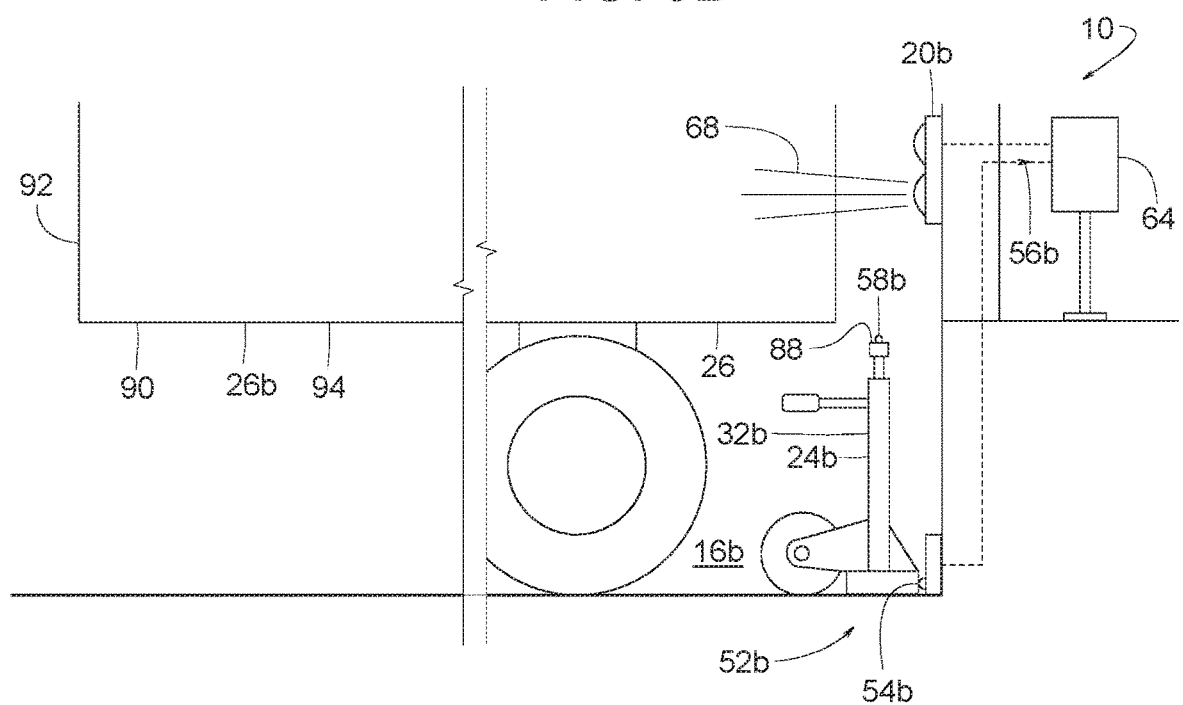

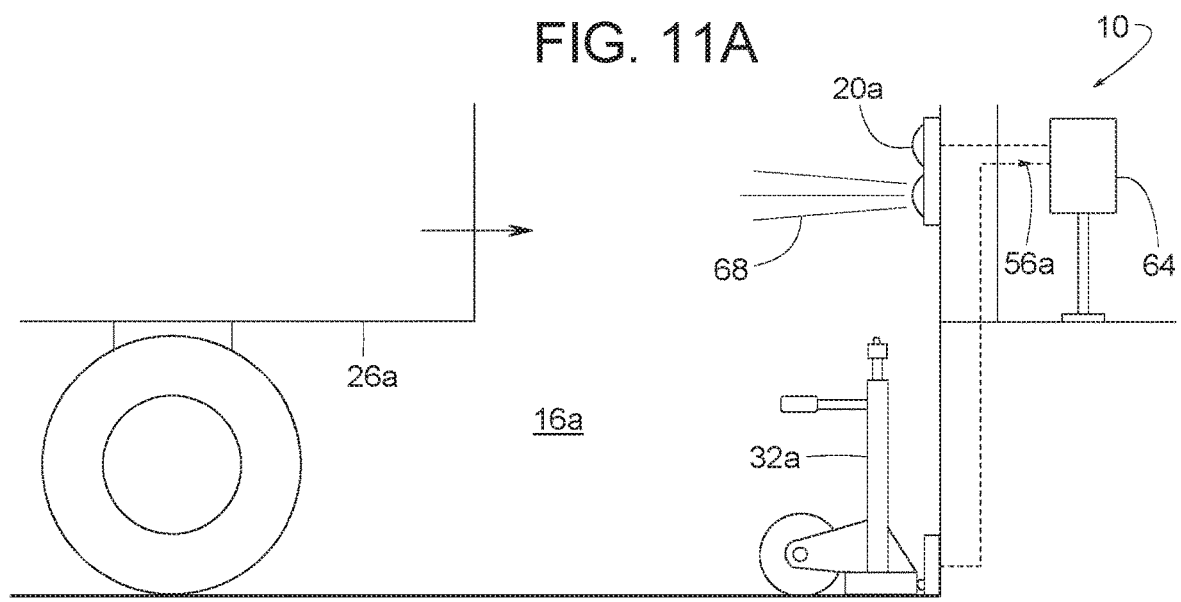
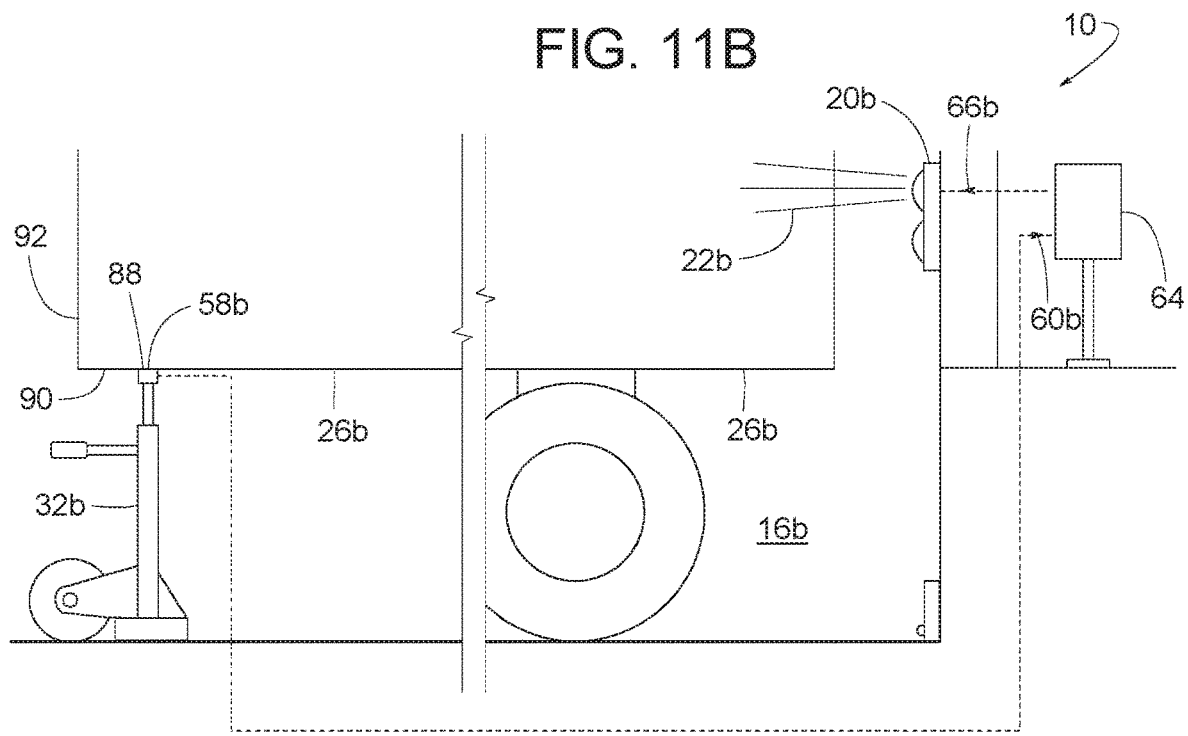

FIG. 14A — 1400

| A | B | C | D | Y₁ | Ȳ₁ |
|---|---|---|---|---|---|
| FIRST BRACE STORED SENSOR | FIRST BRACE OPERATIVE SENSOR | SECOND BRACE STORED SENSOR | SECOND BRACE OPERATIVE SENSOR | OUTPUT-FIRST WARNING ALERT | OUTPUT-FIRST GREEN SAFE LIGHT |
| 1 | 0 | 1 | 0 | 0 | 1 |
| 0 | 0 | X | X | 1 | 0 |
| X | X | 0 | 0 | 1 | 0 |
| 1 | 0 | 0 | 1 | 0 | 1 |
| 0 | 1 | X | X | 1 | 0 |

1410 → $Y_1$ column; 1420 → $\bar{Y}_1$ column

TRUTH TABLE — 1430

|   | A | B | C | D | $Y_1$ | $\bar{Y}_1$ |
|---|---|---|---|---|---|---|
| 0  | 0 | 0 | 0 | 0 | 1 | 0 |
| 1  | 0 | 0 | 0 | 1 | 1 | 0 |
| 2  | 0 | 0 | 1 | 0 | 1 | 0 |
| 3  | 0 | 0 | 1 | 1 | 1 | 0 |
| 4  | 0 | 1 | 0 | 0 | 1 | 0 |
| 5  | 0 | 1 | 0 | 1 | 1 | 0 |
| 6  | 0 | 1 | 1 | 0 | 1 | 0 |
| 7  | 0 | 1 | 1 | 1 | 1 | 0 |
| 8  | 1 | 0 | 0 | 0 | 0 | 1 |
| 9  | 1 | 0 | 0 | 1 | 0 | 1 |
| 10 | 1 | 0 | 1 | 0 | 0 | 1 |
| 11 | 1 | 0 | 1 | 1 | 1 | 0 |
| 12 | 1 | 1 | 0 | 0 | 1 | 0 |
| 13 | 1 | 1 | 0 | 1 | 1 | 0 |
| 14 | 1 | 1 | 1 | 0 | 1 | 0 |
| 15 | 1 | 1 | 1 | 1 | 1 | 0 |

| A | B | C | D | $Z_1$ | $\overline{Z}_1$ |
|---|---|---|---|---|---|
| FIRST BRACE STORED SENSOR | FIRST BRACE OPERATIVE SENSOR | SECOND BRACE STORED SENSOR | SECOND BRACE OPERATIVE SENSOR | OUTPUT- SECOND WARNING ALERT | OUTPUT- SECOND GREEN SAFE LIGHT |
| 1 | 0 | 1 | 0 | 0 | 1 |
| 0 | 0 | X | X | 1 | 0 |
| X | X | 0 | 0 | 1 | 0 |
| X | X | 0 | 1 | 1 | 0 |
| 0 | 1 | 1 | 0 | 0 | 1 |

FIG. 15A

TRUTH TABLE — 1510

|    | A | B | C | D | $Z_1$ | $\overline{Z}_1$ |
|----|---|---|---|---|---|---|
| 0  | 0 | 0 | 0 | 0 | 1 | 0 |
| 1  | 0 | 0 | 0 | 1 | 1 | 0 |
| 2  | 0 | 0 | 1 | 0 | 1 | 0 |
| 3  | 0 | 0 | 1 | 1 | 1 | 0 |
| 4  | 0 | 1 | 0 | 0 | 1 | 0 |
| 5  | 0 | 1 | 0 | 1 | 1 | 0 |
| 6  | 0 | 1 | 1 | 0 | 0 | 1 |
| 7  | 0 | 1 | 1 | 1 | 1 | 0 |
| 8  | 1 | 0 | 0 | 0 | 1 | 0 |
| 9  | 1 | 0 | 0 | 1 | 1 | 0 |
| 10 | 1 | 0 | 1 | 0 | 0 | 1 |
| 11 | 1 | 0 | 1 | 1 | 1 | 0 |
| 12 | 1 | 1 | 0 | 0 | 1 | 0 |
| 13 | 1 | 1 | 0 | 1 | 1 | 0 |
| 14 | 1 | 1 | 1 | 0 | 0 | 1 |
| 15 | 1 | 1 | 1 | 1 | 1 | 0 |

FIG. 15B

TRUTH TABLE

| | A | B | C | D | E | F | $Z_1$ | $\bar{Z}_1$ |
|---|---|---|---|---|---|---|---|---|
| 0 | 0 | 0 | 0 | 0 | 0 | 0 | 1 | 0 |
| 1 | 0 | 0 | 0 | 0 | 0 | 1 | 1 | 0 |
| 2 | 0 | 0 | 0 | 0 | 1 | 0 | 1 | 0 |
| 3 | 0 | 0 | 0 | 0 | 1 | 1 | 1 | 0 |
| 4 | 0 | 0 | 0 | 1 | 0 | 0 | 1 | 0 |
| 5 | 0 | 0 | 0 | 1 | 0 | 1 | 1 | 0 |
| 6 | 0 | 0 | 0 | 1 | 1 | 0 | 1 | 0 |
| 7 | 0 | 0 | 0 | 1 | 1 | 1 | 1 | 0 |
| 8 | 0 | 0 | 1 | 0 | 0 | 0 | 1 | 0 |
| 9 | 0 | 0 | 1 | 0 | 0 | 1 | 1 | 0 |
| 10 | 0 | 0 | 1 | 0 | 1 | 0 | 1 | 0 |
| 11 | 0 | 0 | 1 | 0 | 1 | 1 | 1 | 0 |
| 12 | 0 | 0 | 1 | 1 | 0 | 0 | 1 | 0 |
| 13 | 0 | 0 | 1 | 1 | 0 | 1 | 1 | 0 |
| 14 | 0 | 0 | 1 | 1 | 1 | 0 | 1 | 0 |
| 15 | 0 | 0 | 1 | 1 | 1 | 1 | 1 | 0 |
| 16 | 0 | 1 | 0 | 0 | 0 | 0 | 1 | 0 |
| 17 | 0 | 1 | 0 | 0 | 0 | 1 | 1 | 0 |
| 18 | 0 | 1 | 0 | 0 | 1 | 0 | 1 | 0 |
| 19 | 0 | 1 | 0 | 0 | 1 | 1 | 1 | 0 |
| 20 | 0 | 1 | 0 | 1 | 0 | 0 | 1 | 0 |
| 21 | 0 | 1 | 0 | 1 | 0 | 1 | 1 | 0 |
| 22 | 0 | 1 | 0 | 1 | 1 | 0 | 1 | 0 |
| 23 | 0 | 1 | 0 | 1 | 1 | 1 | 1 | 0 |
| 24 | 0 | 1 | 1 | 0 | 0 | 0 | 1 | 0 |
| 25 | 0 | 1 | 1 | 0 | 0 | 1 | 0 | 1 |
| 26 | 0 | 1 | 1 | 0 | 1 | 0 | 0 | 1 |
| 27 | 0 | 1 | 1 | 0 | 1 | 1 | 0 | 1 |
| 28 | 0 | 1 | 1 | 1 | 0 | 0 | 1 | 0 |
| 29 | 0 | 1 | 1 | 1 | 0 | 1 | 1 | 0 |
| 30 | 0 | 1 | 1 | 1 | 1 | 0 | 1 | 0 |
| 31 | 0 | 1 | 1 | 1 | 1 | 1 | 1 | 0 |

| | A | B | C | D | E | F | $Z_1$ | $\bar{Z}_1$ |
|---|---|---|---|---|---|---|---|---|
| 32 | 1 | 0 | 0 | 0 | 0 | 0 | 1 | 0 |
| 33 | 1 | 0 | 0 | 0 | 0 | 1 | 1 | 0 |
| 34 | 1 | 0 | 0 | 0 | 1 | 0 | 1 | 0 |
| 35 | 1 | 0 | 0 | 0 | 1 | 1 | 1 | 0 |
| 36 | 1 | 0 | 0 | 1 | 0 | 0 | 1 | 0 |
| 37 | 1 | 0 | 0 | 1 | 0 | 1 | 1 | 0 |
| 38 | 1 | 0 | 0 | 1 | 1 | 0 | 1 | 0 |
| 39 | 1 | 0 | 0 | 1 | 1 | 1 | 1 | 0 |
| 40 | 1 | 0 | 1 | 0 | 0 | 0 | 1 | 0 |
| 41 | 1 | 0 | 1 | 0 | 0 | 1 | 0 | 1 |
| 42 | 1 | 0 | 1 | 0 | 1 | 0 | 0 | 1 |
| 43 | 1 | 0 | 1 | 0 | 1 | 1 | 0 | 1 |
| 44 | 1 | 0 | 1 | 1 | 0 | 0 | 1 | 0 |
| 45 | 1 | 0 | 1 | 1 | 0 | 1 | 1 | 0 |
| 46 | 1 | 0 | 1 | 1 | 1 | 0 | 1 | 0 |
| 47 | 1 | 0 | 1 | 1 | 1 | 1 | 1 | 0 |
| 48 | 1 | 1 | 0 | 0 | 0 | 0 | 1 | 0 |
| 49 | 1 | 1 | 0 | 0 | 0 | 1 | 1 | 0 |
| 50 | 1 | 1 | 0 | 0 | 1 | 0 | 1 | 0 |
| 51 | 1 | 1 | 0 | 0 | 1 | 1 | 1 | 0 |
| 52 | 1 | 1 | 0 | 1 | 0 | 0 | 1 | 0 |
| 53 | 1 | 1 | 0 | 1 | 0 | 1 | 1 | 0 |
| 54 | 1 | 1 | 0 | 1 | 1 | 0 | 1 | 0 |
| 55 | 1 | 1 | 0 | 1 | 1 | 1 | 1 | 0 |
| 56 | 1 | 1 | 1 | 0 | 0 | 0 | 1 | 0 |
| 57 | 1 | 1 | 1 | 0 | 0 | 1 | 0 | 1 |
| 58 | 1 | 1 | 1 | 0 | 1 | 0 | 0 | 1 |
| 59 | 1 | 1 | 1 | 0 | 1 | 1 | 0 | 1 |
| 60 | 1 | 1 | 1 | 1 | 0 | 0 | 1 | 0 |
| 61 | 1 | 1 | 1 | 1 | 0 | 1 | 1 | 0 |
| 62 | 1 | 1 | 1 | 1 | 1 | 0 | 1 | 0 |
| 63 | 1 | 1 | 1 | 1 | 1 | 1 | 1 | 0 |

MONITORING AND ALERTING SYSTEMS FOR DETECTING HAZARDOUS CONDITIONS AT LOADING DOCKS

FIELD OF THE DISCLOSURE

This disclosure relates generally to loading docks and, more specifically, to monitoring and alerting systems for detecting hazardous conditions at loading docks.

BACKGROUND

When a truck, trailer or some other vehicle is parked at a loading dock of a building, often a manually operated vehicle brace is used to inhibit the vehicle's movement as cargo is transferred to and/or from the vehicle. Some example vehicle braces include wheel chocks, manually operated vehicle restraints, and portable trailer stands.

A wheel chock wedges between a dock driveway and a wheel of a vehicle to inhibit the vehicle from accidentally pulling forward away from the dock.

Manually operated vehicle restraints include wheel-blocking barriers mounted to a track. The track is positioned on the driveway generally parallel to the parking area. The barrier can be manually moved along the track to position the barrier just ahead of a wheel of the vehicle. The barrier can then be manually moved laterally directly in front of the wheel, thereby blocking the wheel and preventing the vehicle from accidentally moving forward.

When the vehicle is a tractor/trailer combination, a portable trailer stand can be manually moved underneath the trailer to support the trailer's front end. This allows the tractor to leave the dock area while the trailer is loaded and/or unloaded of cargo without risk of the trailer nose diving.

BRIEF DESCRIPTION OF THE DRAWINGS

FIG. 3 is a top view of the example loading dock of FIGS. 1A and 1B illustrating an example first vehicle moving toward an example first dock station of the example loading dock facility and an example second vehicle parked in an example second dock station of the example loading dock facility.

FIG. 4 is a top view similar to FIG. 3 but showing the wheel chock of the example first dock station in a stored position, and showing an example second wheel chock of the example second dock station in an example transition position.

FIG. 5 is a top view similar to FIGS. 3 and 4 but showing the example first wheel chock in the example stored position, and the example second wheel chock of the example second dock station in an example operative position.

FIG. 6 is a top view similar to FIG. 3 but showing the example system of FIGS. 1A and 1B supported by a loading dock system employing a manually operated vehicle restraint as the vehicle brace.

FIG. 8 is a top view of the system of FIG. 7 but showing the example first manually operated vehicle restraint in the example stored position and the example second manually operated vehicle restraint in an example operative position.

FIG. 9A is a right side view of the example first dock station of the example loading dock system of FIGS. 3 and 3A, but including an example first portable trailer stand as the first vehicle brace in an example stored position, and showing the example first signaling device of the example first dock station emitting an example non-warning signal.

FIG. 9B is a right side view of the example second dock station of the example loading dock system of FIGS. 3 and 3B, but including an example second portable trailer stand as the second vehicle brace in an example stored position, and showing the example second signaling device of the example second dock station emitting an example non-warning signal.

FIG. 11A is a right side view of the example first dock station of the loading dock system of FIGS. 5 and 5A showing the example first portable trailer stand in the example stored position and the example first signaling device of the example first dock station emitting the non-warning signal.

FIG. 11B is a right side view of the example second dock station of the loading dock system of FIGS. 5 and 5B showing the example second portable trailer stand in an example operative position and the example second signaling device of the example second dock station emitting an example warning signal.

FIG. 14A depicts an example logic table reflecting example input and output relationships for an example configuration of sensors of the first and the second example dock stations and the example alert device of the first dock station.

FIG. 14B depicts an example truth table based on the example logic table of FIG. 14A.

FIG. 15A depicts another example logic table reflecting example input and output relationships for an example configuration of sensors of the first and the second example dock stations and the example alert device of the second dock station.

FIG. 15B depicts an example truth table based on the example logic table of FIG. 15A.

FIG. 16B depicts an example truth table based on the example logic table of FIG. 16A.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Example monitoring and alerting systems for enhancing safety associated with a loading dock system supporting loading and/or unloading cargo to/from vehicles at multiple dock stations are disclosed. An example monitoring and alerting system includes an alert device that emits a warning signal at a first dock station when a predefined condition occurs at a first dock station and/or a second dock station. The second dock station may be, for example, adjacent the first dock station. In some examples, the monitoring and alerting system alerts a driver of a vehicle in one dock station of a dangerous situation created at another dock station. For instance, if a driver is backing a vehicle into the first dock station while a dock worker is repositioning a vehicle brace at the second dock station, the first station's alert device emits a warning (e.g., a red light, a horn and/or a combination thereof) to warn the driver of the vehicle in the first dock station of the nearby dock worker in the second dock station. Other example conditions can be monitored, and corresponding alerts generated as discussed below.

Figure 1A:
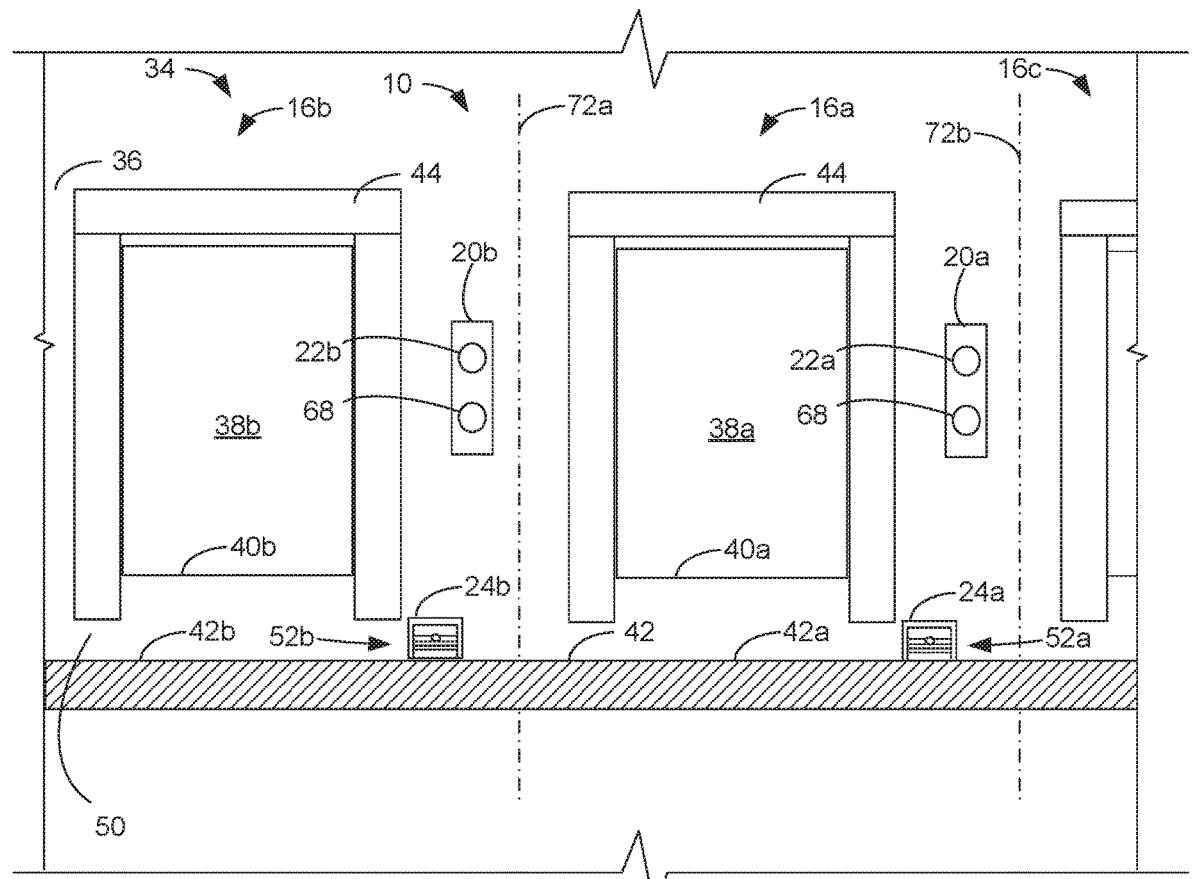
FIG. 1A is a front view of an example loading dock facility equipped with an example system constructed in accordance with teachings of this disclosure for detecting and alerting one or more hazardous conditions.
Figure 1B:
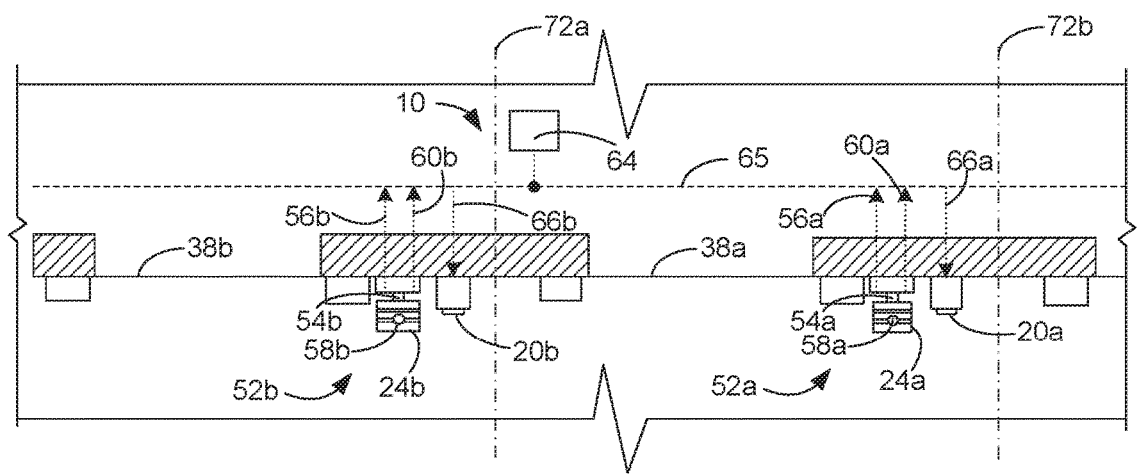
FIG. 1B is a top view of the example loading dock facility and the example monitoring and alert system of FIG. 1A.

FIG. 1A is a front view of an example loading dock facility 34 with an example monitoring and alerting system 10 constructed in accordance with teachings of this disclosure. FIG. 1B is a top view of the example loading dock facility 34 and the example monitoring and alerting system 10 of FIG. 1A. The loading dock facility 34 of the illustrated example has multiple adjacent dock stations (e.g., a first dock station 16a, a second dock station 16b, a third dock station 16c, etc.) at a building 36. In the illustrated example, the example loading dock facility 34 includes at least the first dock station 16a and the second dock station 16b. However, the loading dock facility 34 may include any number of dock stations (e.g., more or less than three dock stations).

Each of the dock stations 16a, 16b, 16c of FIG. 1 may be the same or different. For purposes of simplicity, it is assumed that the dock stations 16a, 16b are identical. It should be understood, however, that the implementation of the dock stations 16a, 16b, 16c may vary without departing from the scope or spirit of this disclosure.

In this example, each of the dock stations 16a, 16b, 16c has a doorway (e.g., a first doorway 38a, a second doorway 38b, a third doorway 38c, etc.) for entering and/or leaving the building 36, an elevated platform (e.g., a first elevated platform 40a, a second elevated platform 40b, etc.), and one or more driveway paths (e.g., a first driveway path 42a, a second driveway path 42b, etc.) provided by a driveway 42. In some examples, the elevated platforms 40a, 40b are integrated into one elevated platform or floor. In some examples, the dock stations 16a, 16b may include a weather barrier 44 (e.g., a dock seal or a dock shelter).

The first, second and third dock stations 16a, 16b, 16c are designated areas where a vehicle (e.g., vehicles 26a, 26b of FIG. 3A) loads and/or unloads its cargo. The platforms 40a, 40b are elevated to reduce (e.g., minimize) the height difference between the vehicle's cargo floor and the floor of the building 36. In some examples, each of the dock stations 16a, 16b, 16c includes a dock leveler that provides an adjustable bridge between the cargo floor of a vehicle and the corresponding platform 40a, 40b. In the illustrated example, the dock stations 16a, 16b, 16c are provided with weather barrier 44. The driveway paths 42a, 42b allow a vehicle to approach the respective doorways 38a, 38b. The weather barrier 44 helps close an air gap between a rear edge of a vehicle (e.g., a rear edge 48 of the vehicles 26a, 26b of FIG. 3A) and a wall 50 defining the corresponding doorway 38a, 38b of the dock station 16a, 16b, 16c.

In the example of FIGS. 1A and 1B, the first dock station 16a is adjacent to the second dock station 16b and adjacent to the third dock station 16c. As used herein, a first dock station is adjacent a second dock station if the first dock station is immediately next to (e.g., within 30 feet) the second dock station such that the first dock station and the second dock station share a boundary line (e.g., an imaginary boundary line and/or imaginary plane) with no intervening dock station between the first and second dock stations. It is noted that the imaginary line and/or plane is conceptual and is not intended to represent a physical barrier. For example, the first dock station 16a and the second dock station 16b of FIG. 1A do not include a physical barrier therebetween but can be thought of as virtually separated along a first vertical imaginary plane 72a. For example, the first vertical imaginary plane 72a between the first doorway 38a and the second doorway 38b conceptually divides and/or otherwise distinguishes the first dock station 16a from the second dock station 16b. A second vertical imaginary plane 72b intermediate the first doorway 38a and another adjacent doorway 38c conceptually divides and/or otherwise distinguishes the first dock station 16a from the third dock station 16c.

To block a vehicle at a respective one of the dock stations 16a, 16b, 16c, each of the dock stations 16a, 16b, 16c of the illustrated example includes a vehicle brace (e.g., a first vehicle brace 24a at the first dock station 16a, a second vehicle brace 24b at the second dock station, etc.). The term, "vehicle brace" refers to any device that engages and/or blocks a vehicle to stabilize the vehicle and/or to inhibit the vehicle's movement. To block a vehicle at the first dock station 16a, the first dock station 16a of the illustrated example includes a first vehicle brace 24a. In the example of FIGS. 1A and 1B, the first vehicle brace 24a is a wheel chock 28a which is manually movable to a first stored position, a first operative position, and one or more first transition positions (e.g., transit positions). The first operative position may be any position when the vehicle brace 24a (e.g., the wheel chock 28a) engages and/or blocks the vehicle. The one or more first transition positions include any position between the first stored position and the first operative position (e.g., where the first vehicle brace 24a is at neither the first stored position nor the first operative position). For example, the first vehicle brace 24a may be in the first stored position when located at a first brace storage area 52a of the first dock station 16a. The first brace storage area 52a may be disposed at any location where the first vehicle brace 24a can be stored when not in use.

To block a vehicle at the second dock station 16b, the second dock station 16b of the illustrated example includes a second vehicle brace 24b. In this example, the second vehicle brace 24b is a wheel chock 28b which is manually movable to a second stored position, a second operative position, and one or more second transition positions. The one or more second transition positions include any position between the second stored position and the second operative position (e.g., where the second vehicle brace 24b is at neither the second stored position nor the second operative position). For example, the second vehicle brace 24b may be in the second stored position when located at a second brace storage area 52b of the second dock station 16b. The second brace storage area 52b may be disposed at any location where the second vehicle brace 24b is to be stored when not in use. The second operative position may be any position when the second vehicle brace 24b (e.g., the wheel chock 28b) engages and/or blocks a vehicle.

Figure 2:
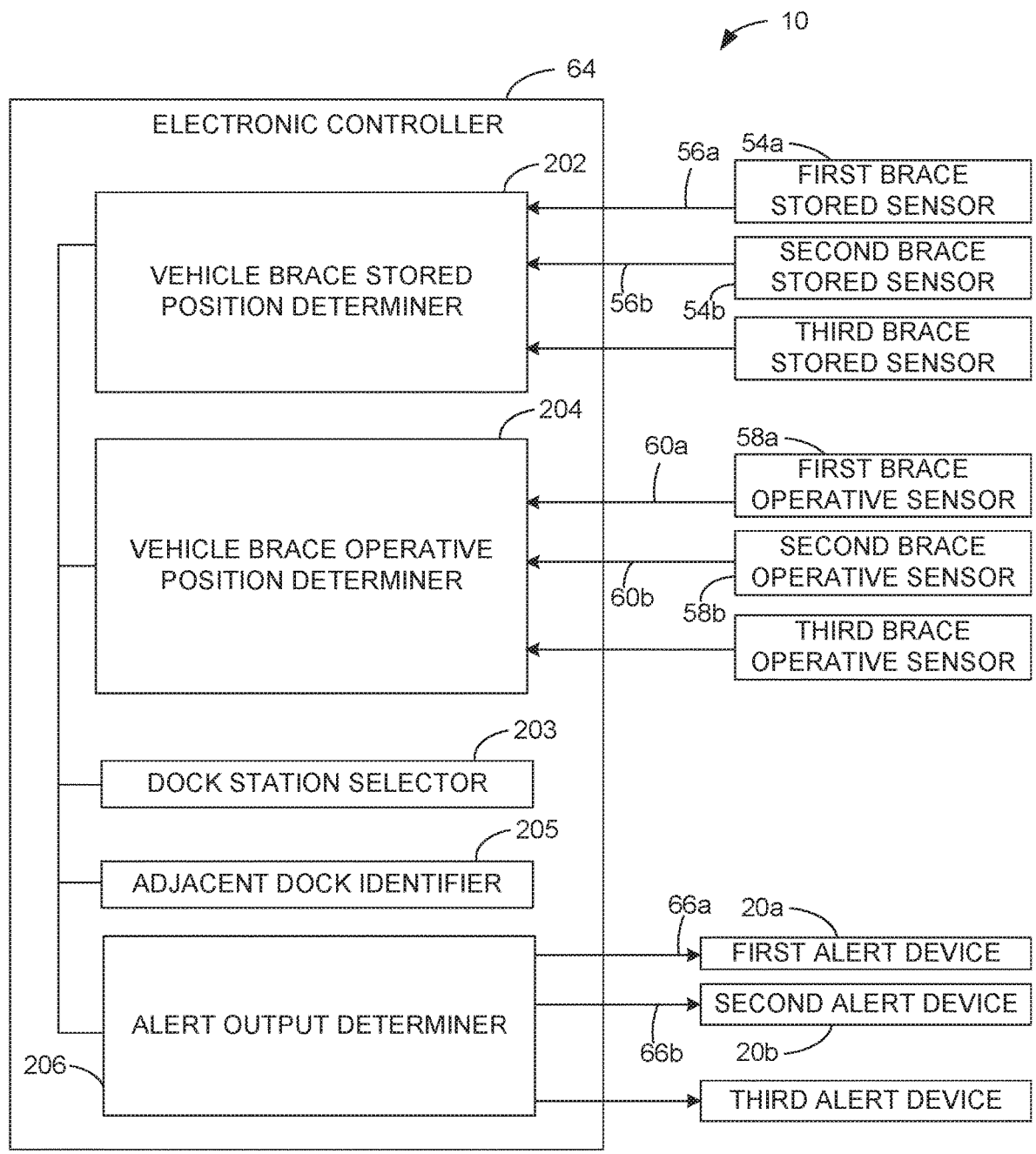
FIG. 2 is a block diagram of an example monitoring and alerting system constructed in accordance with teachings of this disclosure.

To improve safety, the loading dock facility 34 of FIGS. 1A and 1B is equipped with a monitoring and alerting system 10. An example implementation of the monitoring and alerting system 10 is shown in FIG. 2. The monitoring and alerting system 10 of the FIG. 2 includes an example vehicle brace stored position determiner 202, an example dock station selector 203, an example vehicle brace operative position determiner 204, an example adjacent dock identifier 205, and an example alert output determiner 206. In some examples, the vehicle brace stored position determiner 202, the example dock station selector 203, the example vehicle brace operative position determiner 204, the example adjacent dock identifier 205, and the example alert output determiner 206 are in communication via a communication bus Each of the dock stations 16a, 16b, 16c of the illustrated example includes an alert device (e.g., a first alert device 20a at first dock station 16a, a second alert device 20b at a second dock station 16b, etc.). As used herein, the term, "alert device" refers to any apparatus capable of emitting one or more warning signals (e.g., light, sound, vibration, etc.). Examples of an alert device include, but are not limited to, a light fixture, a lamp, a stop-and-go light, a digital display screen, a siren, a horn, a buzzer, and/or any combination thereof.

Figure 3A:
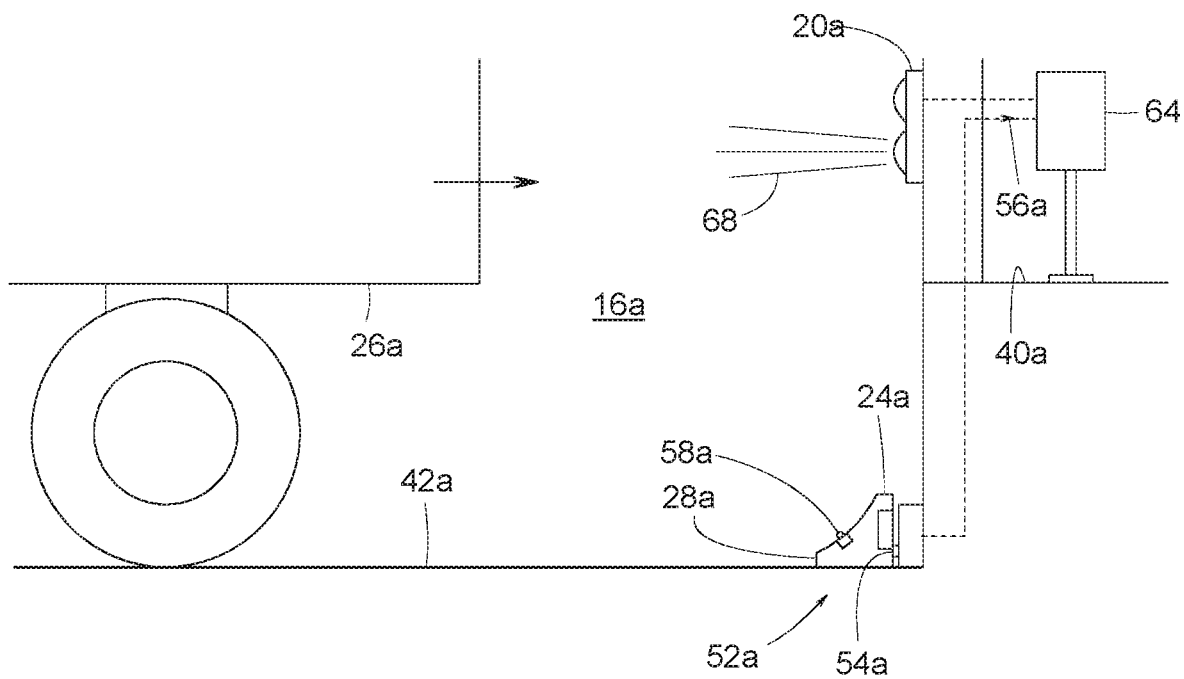
FIG. 3A is a right side view of the example first dock station shown in the state reflected in FIG. 3 with the first wheel chock in the stored position and showing an example first signaling device of the example first dock station emitting an example non-warning signal.
Figure 3B:
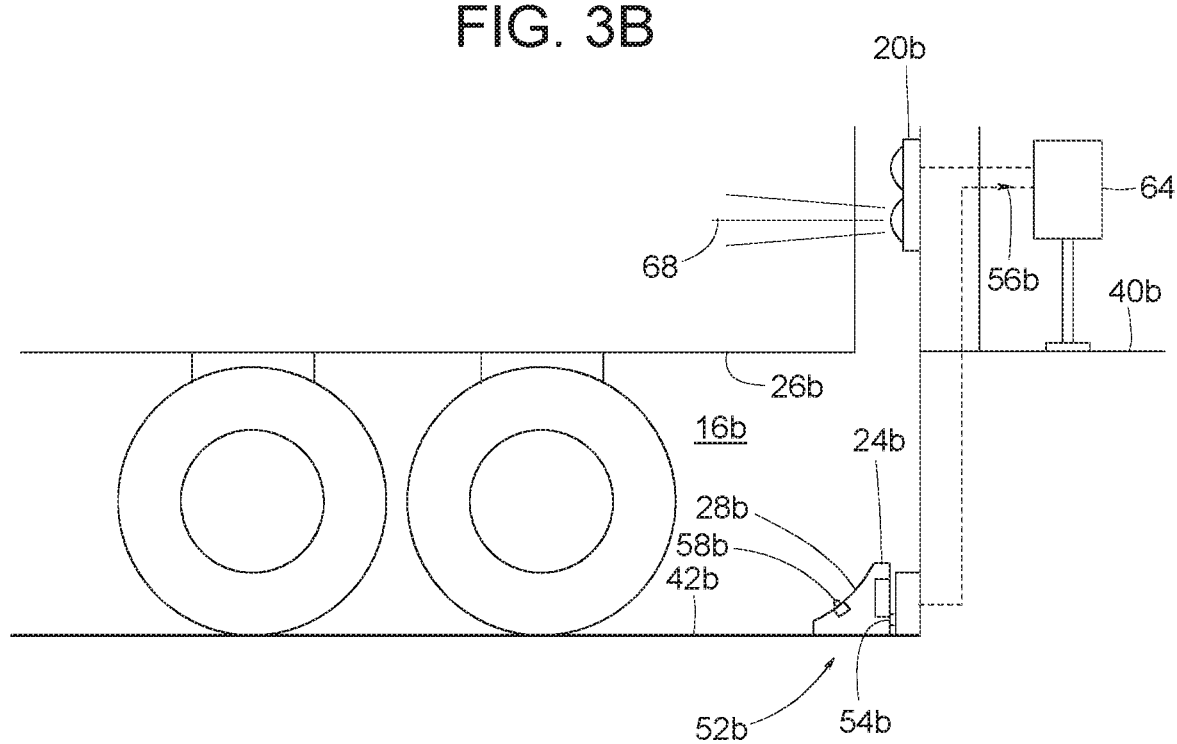
FIG. 3B is a right side view of the example second dock station shown in the state reflected in FIG. 3 with the second wheel chock in the stored position and showing an example second signaling device of the example second dock station emitting an example non-warning signal.
Figure 4A:
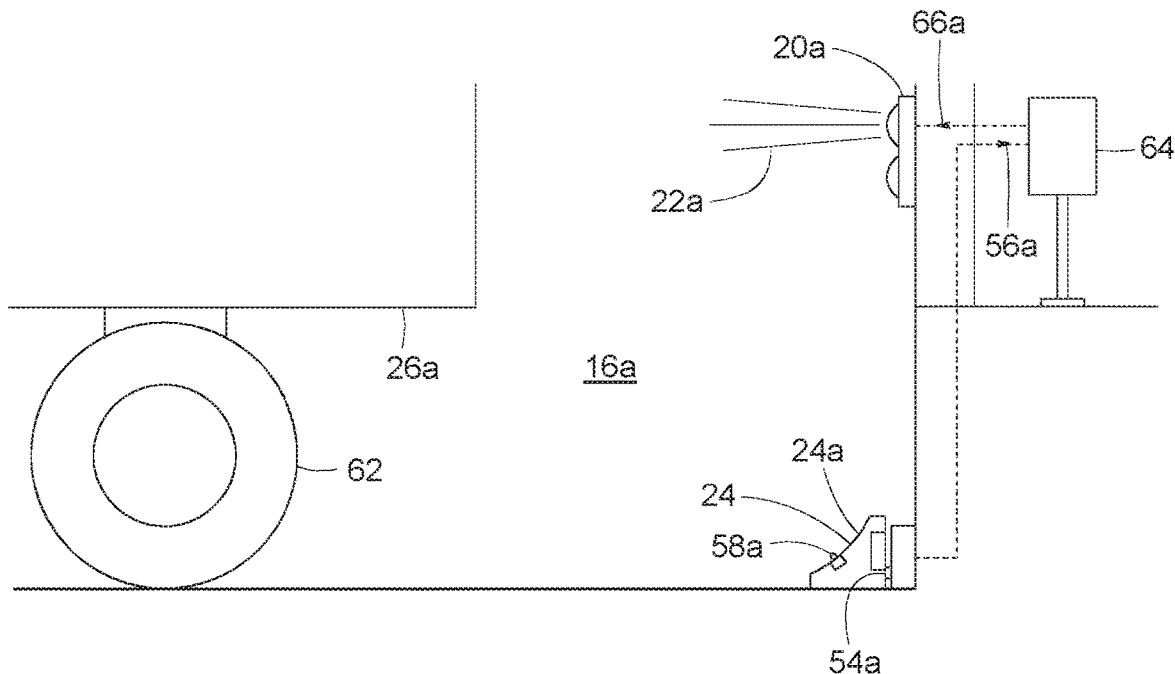
FIG. 4A is a right side view of the example first dock station shown in the state reflected in FIG. 4 with the first wheel chock in the stored position and showing the example first signaling device of the example first dock station emitting an example warning signal.
Figure 4B:
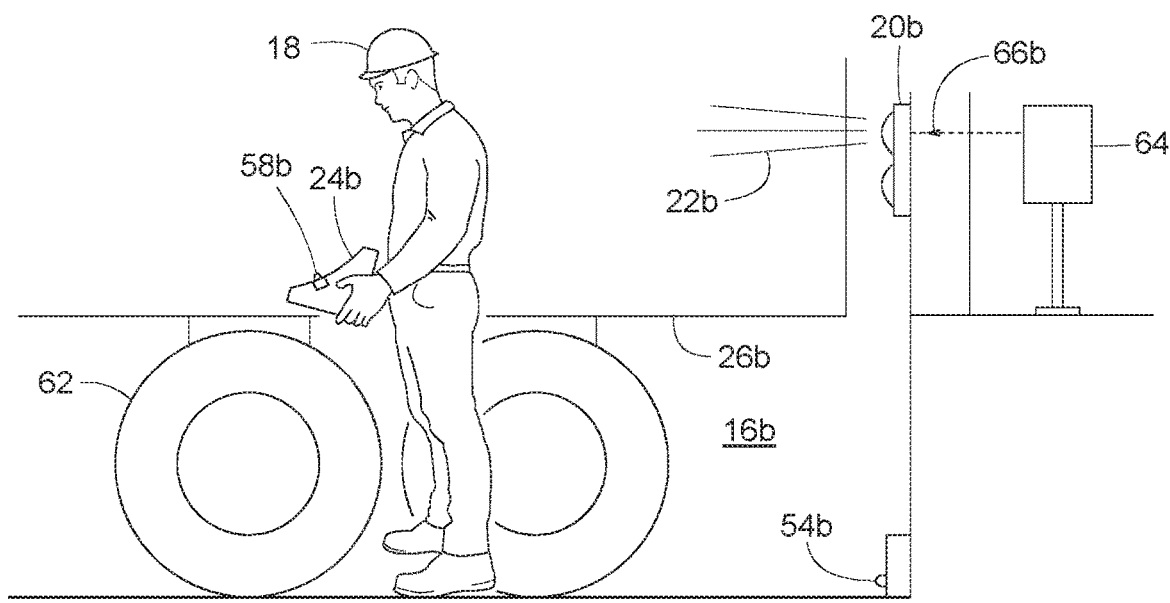
FIG. 4B is a right side view of the example second dock station shown in the state reflected in FIG. 4 with the second wheel chock in a transition position and showing the example second signaling device of the example second dock station emitting an example warning signal.

The monitoring and alerting system 10 of the illustrated example causes the alert device 20a, 20b at one dock station (e.g., a first one of the dock stations 16a or 16b) to emit a warning signal (e.g., a first warning signal 22a and/or a second warning signal 22b as shown in FIGS. 4, 4A and 4B) in response to detection of a possibly hazardous condition. The hazardous condition can be detected at one or more of the dock stations (e.g., the dock station 16a, the dock station 16b and/or the dock station 16c). An example hazardous condition is a dock worker (e.g., a dock worker 18 of FIG. 4) being in the process of manually repositioning a vehicle brace (e.g., the first vehicle brace 24a at the first dock station 16a, the second vehicle brace 24b at the second dock station 16b, etc.) used for blocking and/or bracing a vehicle (e.g., a vehicle 26a, a vehicle 26b, a truck, a trailer, etc.). As used herein, the term "warning signal" refers to any audible, tactile and/or visual indicator. Typically, a warning signal is perceivable by human senses. However, in some examples, the warning signal may be additionally or alternatively received by an electronic device such as a robot, a drone, an unmanned vehicle such as a truck driven by a computer, etc. As examples, the first warning signal 22a emitted from the first alert device 20a and second warning signal 22b emitted from the second alert device 20b may be yellow lights, red lights, tactile alerts, audible alerts and/or any combination thereof. In some examples, each of the alert devices 20a, 20b emits a non-warning signal (e.g., a green light 68 of FIGS. 3, 3A and 3B) when not emitting a warning signal 22a, 22b. A non-warning signal is indicative of no potentially hazardous condition being detected.

To detect a hazardous condition, the monitoring and alerting system 10 of the illustrated example includes sensors 54a, 54b, 58a, 58b to detect and/or determine a location or position (e.g., a stored position, an operative position, or a transition position) of a corresponding vehicle brace (e.g., the first vehicle brace 24a, the second vehicle brace 24b, etc.) at each of the dock stations (e.g., the first dock station 16a, the second dock station 16b, etc.).

Referring to FIGS. 1B and 2, to determine if the first vehicle brace 24a is in the first stored position, the monitoring and alerting system 10 of the illustrated example includes a first brace stored sensor 54a. For example, the first brace stored sensor 54a outputs a first stored signal 56a representative of the first vehicle brace 24a being in the first stored position (e.g., the first vehicle brace 24a is in the first brace storage area 52a). In some examples, the first stored signal 56a is a logic "1" signal. In some examples, the first brace stored sensor 54a outputs a first "not stored" signal indicative of the first vehicle brace 24a not being in the first stored position. In such examples, the first "not stored" signal may be a logic "0" signal.

To determine if the first vehicle brace 24a is in the first operative position, the monitoring and alerting system 10 of the illustrated example includes a first brace operative sensor 58a. The first brace operative sensor 58a of the illustrated example outputs a first operative signal 60a representative of the first vehicle brace 24a being in a first operative position (e.g., in a position engaging and/or blocking the vehicle 26a shown in FIG. 3A and FIG. 3B). In some examples, the first operative signal 60a is a logic "1" signal. In some examples, the first brace operative sensor 58a outputs a first "not operative" signal indicative of the first vehicle brace 24a not being in the first operative position. In such examples, the first "not operative" signal may be a logic "0" signal.

To determine if the second vehicle brace 24b is in the second stored position, the monitoring and alerting system 10 of the illustrated example includes a second brace stored sensor 54b. For example, the second brace stored sensor 54b outputs a second stored signal 56b representative of the second vehicle brace 24b being in a second stored position. In some examples, the second stored signal 56b is a logic "1" signal. In some examples, the second brace stored sensor 54b outputs a second "not stored" signal indicative of the second vehicle brace 24b not being in the second stored position. In such examples, the second "not stored" signal may be a logic "0" signal.

To determine if the second vehicle brace 24b is the second operative position, the monitoring and alerting system 10 of the illustrated example includes a second brace operative sensor 58b. For example, the second brace operative sensor 58b outputs a second operative signal 60b representative of the second vehicle brace 24b being in a second operative position (e.g., in a position engaging and/or blocking the vehicle 26b shown in FIGS. 5 and 5B). In some examples, the second operative signal 60b is a logic "1" signal. In some examples, the second brace operative sensor 58b outputs a second "not operative" signal indicative of the second vehicle brace 24b not being in the second operative position. In such examples, the second "not operative' signal may be a logic "0" signal.

The stored signals 56a, 56b are labeled as "stored" to indicate they correspond to the vehicle braces 24a and 24b being in stored positions, respectively. It is not intended to imply the signals themselves are "stored." Likewise, the operative signals 60a, 60b are labeled as "operative" to indicate they correspond to the vehicle braces 24a, 24b being in operative positions, respectively. They stored signals 56a, 56b, the not stored signals, the operative signals 60a, 60b, and the not operative signals can be generated in real time. In some examples, one of the stored or not stored signals is not used. Instead, only, for example, the stored signal is used and the lack of a stored signal is interpreted as not stored. Similarly, one of the operative or not operative signals is not used. Instead, only, for example, the operative signal is used and the lack of an operative signal is interpreted as not operative.

The stored signals 56a, 56b and/or the operative signals 60a, 60b represent a binary value (e.g., on/off), a digital value, and/or an analog value. For example, the monitoring and alerting system 10 of the illustrated example may determine a vehicle brace is in the stored position based on a signal received (e.g., an output signal of the binary bit "1" from the first brace stored sensor 54a or the second brace stored sensor 54b) and the vehicle brace is not to be in the stored position based on a different signal received (e.g., an output signal of the binary bit "0" from the first brace stored sensor 54a or the second brace stored sensor 54b). In some examples, the monitoring and alerting system 10 of the illustrated example may determine the vehicle brace to be in the operative position based on a signal received (e.g., a feedback signal of the binary bit "1" from the first brace operative sensor 58a or the second brace operative sensor 58b) and the vehicle brace is not be in the operative position based on a different signal received (e.g., a feedback signal of the binary bit "0" from the first brace operative sensor 58a or the second brace operative sensor 58b).

The first brace stored sensor 54a and/or the second brace stored sensor 54b may be implemented by any device able to sense the first vehicle brace 24a being in the first stored position or the second vehicle brace 24b being in the second stored position, respectively. Example implementations of the first brace stored sensor 54a and/or the second brace stored sensor 54b include, but are not limited to, an electromechanical limit switch, a proximity sensor, a string potentiometer, a laser emitter/receiver, and/or a photoelectric eye.

The first brace operative sensor 58a and/or the second brace operative sensor 58b may be implemented by any device able to sense the first vehicle brace 24a being in the first operative position or the second vehicle brace 24b being in the second operative position, respectively. Example implementations of the first brace operative sensor 58a and/or the second brace operative sensor 58b include, but are not limited to, an electromechanical limit switch, a proximity sensor, a string potentiometer, a laser emitter/receiver, and/or a photoelectric eye. In some examples, the first brace operative sensor 58a can sense engagement (e.g., direct or indirect contact) between the first vehicle brace 24a and a vehicle (e.g., a wheel 62 and/or other structure of a vehicle 26a of FIG. 3) and/or the second brace operative sensor 58b can sense engagement (e.g., direct or indirect contact) between the second vehicle brace 24b and a (e.g., a wheel 62 and/or other structure of a vehicle 26b of FIG. 3). Further, the sensors 54a, 54b, 58a, 58b providing the stored signals 56a, 56b and/or the operative signals 60a, 60b are not limited to the example brace stored sensors 54a, 54b and the example brace operative sensors 58a, 58b of FIGS. 1A and 1B. In some examples, the sensors that provide the stored signals 56a, 56b and/or operative signals 60a, 60b of an example monitoring and alerting system 10 disclosed herein may include one or more sensors that represent an image, a video and/or any other suitable signal(s). For example, any sensor (e.g., a camera) capable of determining the presence of a vehicle brace at a storage location, an operative location and/or a transition position can be utilized.

As mentioned above, the monitoring and alerting system 10 of the illustrated example includes an electronic controller 64 in communication with the brace stored sensors 54a, 54b, the brace operative sensors 58a, 58b, and the alert devices 20a, 20b via a network 65. The network 65 of the illustrated example is a process control network. However, the example network 65 may be implemented using any suitable wired and/or wireless network(s) including, for example, one or more data buses, one or more process control networks, one or more Local Area Networks (LANs), one or more wireless LANs, one or more cellular networks, one or more fiber optic networks, one or more private networks, one or more public networks, etc. The network 65 enables the example sensors 54a, 54b, 58a, 58b, to be in communication with the electronic controller 64. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the electronic controller 64 is installed at a single location. In some examples, the electronic controller 64 includes components positioned at (e.g., distributed to) two or more different locations. In some examples, one or more components of the electronic controller 64 are integrated with the brace stored sensors 54a, 54b, the brace operative sensors 58a, 58b, and/or the alert devices 20a, 20b. In some examples, one or more components of the electronic controller 64 are implemented at a remote location accessible via a network (e.g., in the cloud).

In some examples, the electronic controller 64 includes one or more processing platforms as described below in connection with a processing platform 1300 of FIG. 13. For example, the electronic controller 64 may include one or more processors such as an example processor 1312 described below in connection with the processing platform 1300 of FIG. 13.

In some examples, the electronic controller 64 includes one or more logic circuits (e.g., one logic circuit, a switch connected to two or more logic circuits to facilitate the operation of zero, one, or more of the two or more logic circuits, etc.). For example, the electronic controller 64 may be implemented entirely or in part by one or more logic circuits such as a first example logic circuit 1440 depicted in FIG. 14C, a second example logic circuit 1520 depicted in FIG. 15C, or a third example logic circuit 1620 depicted in FIG. 16C. For example, the electronic controller 64 may be implemented by the first logic circuit 1440 or the second logic circuit 1520 when a dock station is determined to have one adjacent dock station, and the electronic controller 64 may be implemented by the third example logic circuit 1620 when a dock station is determined to have two adjacent dock stations.

The electronic controller 64 of the illustrated example determines the positions of the vehicle braces 24a, 24b relative to the respective dock stations 16a, 16b based on the first stored signal 56a (or the first not stored signal) received from the first brace stored sensor 54a, the first operative signal 60a (or the first not operative signal) received from the first brace operative sensor 58a, the second stored signal 56b (or the second not stored signal) received from the second brace stored sensor 54b, and the second operative signal 60b (or the second not operative signal) received from the second brace operative sensor 58b. Upon determining the respective positions of the vehicle braces 24a, 24b, the electronic controller 64 provides a first output signal 66a (e.g., a logic high signal) or a second output signal (e.g., a logic low signal) to control the first alert device 20a and/or provides a third output signal 66b (e.g., a logic high signal) or a fourth output signal (e.g., a logic low signal) to control the second alert device 20b, depending on whether and/or where alerting is needed. In some examples, only one output signal is required to control one of the alert devices (e.g., if the alert devices default to a state such as "alert" or "non-alert" and no change of state is needed). In some examples, a signal or lack of signal can be used to control the alert devices. Dotted arrows illustrate the brace stored sensors 54a, 54b providing the output signals (56a, 56b) indicating whether the vehicle braces 24a, 24b are in the stored position. As mentioned above, the output signals may represent a stored or a not stored signal, but only one arrow is shown for clarity of illustration. Dotted arrows represent first and second brace operative sensors (58a, 58b) providing output signals (60a, 60b) indicating whether the vehicle braces 24a, 24b are in the operative positions. As mentioned above, the output signals may represent an operative signal or a not operative signal, but only one arrow is shown for clarity in the illustration.

In some examples, the first brace stored sensor 54a provides means for sensing a first stored position of a first vehicle brace, the second brace stored sensor 54b provides means for sensing a second stored position of a first vehicle brace, the first brace operative sensor 58a provides means for sensing a first operative position of the first vehicle brace, and the second brace operative position sensor 58b provides means for sensing a second operative position of the second vehicle brace. In some examples, the first brace stored sensor 54a and/or the first brace operative sensor 58a provides first means for sensing the first brace position of the first vehicle brace 24a at the first dock station 16a, where the first brace position is one of the first stored position, the first operative position or the first transition position. In some examples, the second brace stored sensor 54b and/or the second brace operative sensor 58b provides second means for sensing the second brace position of the second vehicle brace 24b at the second dock station 16b, where the first brace position is one of the first stored position, the first operative position or the first transition position. In some examples, the first alert device 20a provides first means for emitting a warning signal (e.g., an alert) at a first dock station and the second alert device 20b provides second means for emitting a warning signal (e.g., an alert) at a second dock station. In some examples, the electronic controller 64 provides means for controlling the first alert device 20a located at the first dock station 16a based on the first brace position of the first vehicle brace 24a at the first dock station 16a and the second brace position of the second vehicle brace 24b at the second dock station 16b and/or a position of the third brace position of a third vehicle brace at the third dock station 16c. In some examples, the electronic controller 64 provides means for controlling the second alert device 20b located at the second dock station 16b based on the first brace position of the first vehicle brace 24a and the second brace position of the second vehicle brace 24b.

FIG. 2 is a block diagram representative of an example implementation of the electronic controller 64 of FIGS. 1A and 1B disclosed herein. The example electronic controller 64 of the illustrated example includes an example vehicle brace stored position determiner 202, an example dock station selector 203, an example vehicle brace operative position determiner 204, an example adjacent dock identifier 205, and an example alert output determiner 206. In some examples, the vehicle brace stored position determiner 202, the example dock station selector 203, the example vehicle brace operative position determiner 204, the example adjacent dock identifier 205, and the example alert output determiner 206 are in communication (e.g., via a communication bus, by writing and reading data from a memory, etc.).

The electronic controller 64 of the illustrated example determines if a vehicle brace (e.g., the first vehicle brace 24a) associated with a dock station (e.g., the first dock station 16a) is in a stored position, operative position or one or more transition positions, and determines if a vehicle brace (e.g., the second vehicle brace 24b, the third vehicle brace, etc.) associated with another dock station (e.g., the second dock station 16b, the third dock station 16c) immediately adjacent the first dock station is in a stored position, an operative position or one or more transition positions.

To monitor and/or identify a condition at each station as influenced by one or more adjacent dock stations, the electronic controller 64 of the illustrated example includes the dock station selector 203. The dock station selector 203 identifies or selects a dock station (e.g., the first dock station 16a) to monitor and/or identify a condition at the selected dock station and the adjacent dock station(s). For example, the dock station selector 203 selects a dock station (e.g., one of the dock stations 16a-c) to monitor and/or to determine an alert output (e.g., the warning signals 22a, 22b) for an alert device (e.g., the alert devices 20a, 20b) based on the conditions of the selected dock station and/or the dock stations adjacent the selected dock station. In some examples, the example dock station selector 203 may sequentially select the dock stations 16a-c in a specific order. For example, the dock station selector 203 may monitor and/or determine an alert status of the dock stations 16a-c in the following order: the first dock station 16a, the second dock station 16b, the third dock station 16c, etc. In some examples, the dock stations 16a-c may be selected simultaneously and processed substantially in parallel. In some examples, the dock station selector 203 may select a dock station (e.g. one of the dock stations 16a, 16b, 16c) at any time and in any order. For example, the dock station selector 203 may randomly or pseudorandomly select a dock station to monitor.

To determine if the selected dock station has an adjacent dock (e.g., a first adjacent dock, a second adjacent dock), the electronic controller 64 of the illustrated example includes the adjacent dock identifier 205. The adjacent dock identifier 205 may receive and/or obtain an identification of the selected dock station from the dock station selector 203. For example, if the dock station selector 203 selects the first dock station (e.g., the first dock station 16a) for monitoring/analyzing, the adjacent dock identifier 205 may identify the second and third dock stations (e.g., the dock stations 16b-c) as adjacent or immediately next to the selected dock station (e.g., the first dock station 16a). To determine which dock stations are adjacent, the adjacent dock identifier 205 may receive on one or more inputs provided to the electronic controller 64 during an initial set up operation. For example, the inputs may indicate the first dock station 16a is adjacent the second dock station 16b and the third dock station 16c. The second dock station 16b may be indicated as having only the first dock station 16a as an adjacent dock station. In examples disclosed herein, means for determining adjacent dock station(s) may be implemented by the example adjacent dock identifier 205.

To determine whether a vehicle brace of a dock station is in a stored position, the electronic controller 64 of the illustrated example includes the vehicle brace stored position determiner 202. For example, the vehicle brace stored position determiner 202 of the illustrated example receives, retrieves and/or obtains stored output signals associated with vehicle brace stored sensors (e.g., the brace stored sensors 54a, 54b of FIGS. 1A-1B) of corresponding dock stations (e.g., the first dock station 16a, the second dock station 16b, the third dock station 16c, etc.).

For example, referring to the example loading dock facility 34 of FIGS. 1A and 1B, the vehicle brace stored position determiner 202 of the illustrated example receives the first stored output signal 56a from the first brace stored sensor 54a of the first dock station 16a, the second stored signal 56b from the second brace stored sensor 54b of the second dock station 16b, and the third stored output signal from the third brace stored sensor of the third dock station 16c. For example, the vehicle brace stored position determiner 202 may determine that the vehicle brace 24a of the first dock station 16a is in the stored position based on a received stored signal 56a having a first value (e.g., a bit value of one) and may determine that the vehicle brace 24a of the first dock station 16a is not in the stored position based on a received stored signal 56a having a second value (e.g., a bit value of zero) different than the first value. In some examples, the brace stored position determiner 202 may determine that the first vehicle brace 24a is not in the stored position when a signal is not received from the first brace stored sensor 54a.

To determine whether a vehicle brace of a dock station is in an operative position, the electronic controller 64 of the illustrated example includes the vehicle brace operative position determiner 204. For example, the vehicle brace operative position determiner 204 of the illustrated example receives, retrieves and/or obtains operative output signals associated with operative sensors (e.g., the brace operative sensors 58a, 58b of FIGS. 1A-1B) of vehicle braces (the first vehicle brace 24a, the second vehicle brace 24b, etc.) at corresponding dock stations (e.g., the first dock station 16a, the second dock station 16b, the third dock station 16c, etc.).

For example, referring to the example loading dock facility 34 of FIGS. 1A and 1B, the vehicle brace operative position determiner 204 of the illustrated example receives the first operative signal 60a from the first brace operative sensor 58a of the first vehicle brace 24a at the first dock station 16a, the second operative signal 60b from the second brace operative sensor 58b of the second vehicle brace 24b at the second dock station 16b, and the third operative output signal from the third brace operative sensor of the third vehicle brace at the third dock station 16c. For example, the vehicle brace operative position determiner 204 may determine that the vehicle brace 24a of the first dock station 16a is in the operative position based on a received operative signal 60a having a first value (e.g., a bit value of one) and may determine that the vehicle brace 24a is not in the operative position based on a received operative signal 60a having a second value (e.g., a bit value of zero) different than the first value. In some examples, the vehicle brace operative position determiner 204 may determine that the first vehicle brace 24a is not in the operative position when a signal is not received from the first brace operative sensor 58a.

When the vehicle brace stored position determiner 202 of the illustrated example receives, retrieves and/or obtains a feedback signal from a stored sensor of a vehicle brace (e.g., the vehicle brace 24a) of a dock station that does not indicate that the vehicle brace is in the stored position, and the vehicle brace operative position determiner 204 receives, retrieves and/or obtains a feedback signal from the operative sensor of the vehicle brace that the does not indicate that the vehicle brace is in the operative position, the electronic controller 64 of the illustrated example determines that the vehicle brace of the corresponding dock station is in a transition position (e.g., one or more positions between the stored position and the operative position).

Additionally, the vehicle brace stored position determiner 202 of the illustrated example determines whether another vehicle brace (e.g., the second vehicle brace 24b) associated with another dock station (e.g., the second dock station 16b) adjacent the dock station being analyzed is in a stored position based on a second received stored position feedback signal (e.g., the stored signal 56b) of another brace stored sensor (e.g., the second brace stored sensor 54b) associated with the adjacent vehicle brace (e.g., the second vehicle brace 24b). In some examples, the vehicle brace stored position determiner 202 receives a stored output signal (e.g., a stored output signal) from a third stored sensor associated with a third vehicle brace of a third dock station (e.g., the third dock station 16c that is adjacent the first dock station 16a). In some examples, the vehicle brace stored position determiner 202 of the illustrated example may receive any number of additional stored position feedback signals to determine a condition of any number of vehicle braces at corresponding dock stations (which may or may not be adjacent the dock station being analyzed depending on the application).

Additionally, the vehicle brace operative position determiner 204 of the illustrated example determines whether a second vehicle brace (e.g., the second vehicle brace 24b) associated with a second dock station (e.g., the second dock station 16b) adjacent the dock station being analyzed (e.g., the first dock station 16a) is in an operative position based on a second received operative feedback signal (e.g., the operative signal 60b) of a second operative sensor (e.g., the second brace operative sensor 58b) associated with the second vehicle brace (e.g., the second vehicle brace 24b). In some examples, the vehicle brace operative position determiner 204 of the illustrated example determines whether a third vehicle brace associated with a third dock station (e.g., the third dock station 16c) adjacent the dock station being analyzed (e.g., the first dock station 16a) is in an operative position based on a third received operative position feedback signal from a third operative sensor corresponding to the third vehicle brace (e.g., of the third dock station 16c). In some examples, the vehicle brace operative position determiner 204 may receive any number of additional operative signals.

If the vehicle brace stored position determiner 202 of the illustrated example receives, retrieves and/or obtains a stored feedback signal from a stored sensor of a vehicle brace (e.g., the second vehicle brace 24b) of a second dock station (e.g., immediately) adjacent the first dock station that does not indicate that the second vehicle brace is in the stored position, and the vehicle brace operative position determiner 204 receives, retrieves and/or obtains an operative feedback signal from the operative sensor of the second vehicle brace (e.g., the second vehicle brace 24b) that the does not indicate that the second vehicle brace is in the operative position, the electronic controller 64 of the illustrated example determines that the vehicle brace (e.g., the second vehicle brace 24b) of the second dock station (e.g., the second dock station 16b) is in a transition position (e.g., one or more positions between the stored position and the operative position).

To determine whether or not to initiate an alarm of a dock station being analyzed (e.g., the first dock station 16a) and/or a second dock station (e.g., the second dock station 16b, the third dock station 16c, etc.) immediately adjacent the dock station being analyzed, the electronic controller 64 of the illustrated example includes the alert output determiner 206. Specifically, to determine whether to initiate an alarm via an alert device (e.g., the first alert device 20a, the second alert device 20b, etc.) of a dock station (e.g., the first dock station 16a, the second dock station, etc.), the example alert output determiner 206 of the illustrated example receives, retrieves and/or obtains output signals from the vehicle brace stored position determiner 202 and the vehicle brace operative position determiner 204. In some examples, the alert output determiner 206 of the illustrated example outputs one or more first and second alarm output signals. The alert output determiner 206 may additionally output alert signals corresponding to any other dock station from which stored and operative feedback signals have been received.

For example, the alert output determiner 206 of the illustrated example initiates an alert signal (e.g., the output signal 66a) for a first dock station (e.g., the first dock station 16a) when a vehicle brace (e.g., the first vehicle brace 24a) of the first dock station is not in the stored position. In some examples, the alert output determiner 206 of the illustrated example may cause an alert device (e.g., the first alert device 20a) of the first dock station (e.g., the first dock station 16a) to output a non-alarm output (e.g., the green light 68) when the vehicle brace stored position determiner 202 determines that the vehicle brace (e.g., the first vehicle brace 24a) is in a stored position. In some examples, the alert output determiner 206 may additionally or alternatively initiate an alert for the first dock station (e.g., the first dock station 16a) when the electronic controller 64 determines that a second vehicle brace (e.g., the second vehicle brace 24b) of a second dock station (e.g., the second dock station 16b) adjacent to the first dock station is not in either the stored position or the operative position even if, for example, the electronic controller 64 determines that the first vehicle brace (e.g., the first vehicle brace 24a) of the first dock station (e.g., the first dock station 16a) is in the stored position.

In some examples the alert output determiner 206 may initiate a first type of alert signal to cause a first alert device (e.g., the first alert device 20a) to emit and/or display a first type of alert (e.g., a visual alert such as a red light) when a vehicle brace (e.g., the vehicle brace 24a) of a dock station (e.g., the first dock station 16a) is in the operative position. In some such examples, the alert output determiner 206 may initiate a second type of alert signal to cause the first alert device (e.g., the first alert device 20a) to emit and/or display a second type of alert (e.g., an audible alarm) when a vehicle brace (e.g., the vehicle brace 24a) of a dock station (e.g., the first dock station 16a) is in a transition position (i.e., neither in the stored position nor the operative position). In such examples, the second type of alert signal may be an audible alarm and/or a combination of an audible alarm and a visual alarm.

In some examples, the alert output determiner 206 may transmit a non-alert signal in the event that an alarm is not needed (i.e., no relevant hazardous condition is detected) that is different from the signal transmitted when an alarm is activated (i.e., a relevant hazardous condition is detected). For example, the alert output determiner 206 may cause the alert devices 20a and/or 20b of FIGS. 1A-1B to initiate the green light 68 when the alert output determiner 206 determines that an alert is not needed at the dock stations 16a and/or 16b. For example, when the vehicle brace stored position determiner 202 and the vehicle brace operative position determiner 204 determine that the vehicle brace 24a of the first dock station 16a is in a stored position and the vehicle braces 24b, 24c of the adjacent dock stations 16b-c are not in a transition position, the alert output determiner 206 may provide an output signal to cause the first alert device 20a of the first dock station 16a to emit the green light 68.

In some examples, the electronic controller 64 determines whether to persist and/or otherwise continue monitoring the monitoring and alerting system 10. For example, the electronic controller 64 may determine to discontinue monitoring the monitoring and alerting system 10 based on a user input, receiving continuing communication (e.g., a communication heartbeat signal, sensor information, etc.) from a sensor communicatively coupled to the monitoring and alerting system 10, etc.

In examples disclosed herein, means for selecting a dock station may be implemented by the example dock station selector 203. In some examples, means for receiving one or more vehicle brace stored position signals may be implemented by the example vehicle brace stored position determiner 202. In some examples, means for receiving one or more vehicle brace operative position signals may be implemented by the example vehicle brace operative position determiner 204.

In some examples, means for determining a first brace position being a stored position may be implemented by the example vehicle brace stored position determiner 202. In some examples, means for determining a second brace position being a stored position may be implemented by the example vehicle brace stored position determiner 202.

In some examples, means for determining a first brace position of a first brace being an operative position may be implemented by the example vehicle brace operative position determiner 204. In some examples, means for determining a second brace position being an operative position may be implemented by the example vehicle brace operative position determiner 204.

In some examples, means for determining a first brace being a transition position may be implemented by the example vehicle brace stored position determiner 202, the example vehicle brace operative position determiner 204 and/or the alert output determiner 206. In some examples, the means for determining a first brace position is to determine that a first brace position is a first transition position in response to the first means for sensing providing neither a first stored position signal nor a first operative position signal.

In some examples, means for determining a second brace being a transition position may be implemented by the example vehicle brace stored position determiner 202, the example vehicle brace operative position determiner 204 and/or the alert output determiner 206. In some examples, means for determining a second brace position is to determine that a second brace position is a second transition position in response to second means for sensing providing neither a stored position signal nor an operative position signal.

In some examples, means for controlling a first alert device located at the first dock station (e.g., based on a first brace position of a first vehicle brace at a first dock station and/or the second brace position of a second vehicle brace of a second dock station) may be implemented by the example vehicle brace stored position determiner 202, the example vehicle brace operative position determiner 204 and/or the alert output determiner 206. In some examples, means for controlling a second alert device located at a second dock station (e.g., based on a first brace position of a first vehicle brace at a first dock station and/or the second brace position of a second vehicle brace of a second dock station) may be implemented by the example vehicle brace stored position determiner 202, the example vehicle brace operative position determiner 204 and/or the alert output determiner 206.

While an example manner of implementing the electronic controller 64 of FIGS. 1A and 1B is illustrated in FIG. 2, one or more of the elements, processes and/or devices illustrated in FIG. 2 may be combined, divided, re-arranged, omitted, eliminated and/or implemented in any other way. Further, the example vehicle brace stored position determiner 202, the example dock station selector 203, the example vehicle brace operative position determiner 204, the example adjacent dock station identifier 205, and the example alert output determiner 206 and/or, more generally, the example electronic controller 64 of FIG. 2 may be implemented by hardware, software, firmware and/or any combination of hardware, software and/or firmware. Thus, for example, any of the example vehicle brace stored position determiner 202, the example dock station selector 203, the example vehicle brace operative position determiner 204, the example adjacent dock station identifier 205, and the example alert output determiner 206 and/or, more generally, the example electronic controller 64 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example vehicle brace stored position determiner 202, the example dock station selector 203, the example vehicle brace operative position determiner 204, the example adjacent dock station identifier 205, and the example alert output determiner 206 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic controller 64 of FIGS. 1A and 1B may include one or more elements, processes and/or devices in addition to, or instead of, those illustrated in FIG. 2, and/or may include more than one of any or all of the illustrated elements, processes and devices.

Example conditions monitored and/or identified by the monitoring and alerting system 10 for different example scenarios at the loading dock facility 34 of FIGS. 1A and 1B are illustrated in FIGS. 3-5. FIG. 3 is a top view of the example loading dock facility 34 of FIGS. 1A and 1B showing a first vehicle 26a backing into the first dock station 16a, a second vehicle 26b parked at (e.g., fully backed up to) the second doorway 38b of the second dock station 16b, and a third vehicle 26c parked at the third dock station 16c. FIG. 3A is a side view of the example first dock station 16a of FIG. 3. FIG. 3B is a side view of the example second dock station 16b of FIG. 3. Additionally, the vehicle braces 24a, 24b in FIGS. 3, 3A and 3B (and the vehicle brace at the third dock station 16c) are in their respective stored positions. Thus, the brace stored sensors 54a, 54b send and/or output the stored signals 56a, 56b to the electronic controller 64. Specifically, the vehicle brace stored position determiner 202 receives the stored signals 56a, 56b from the respective brace stored sensors 54a, 54b (and the brace stored sensor of the vehicle brace of the third dock station 16c) and determines that the vehicle braces 24a, 24b are in their stored positions. Therefore, the alert output determiner 206 does not command the corresponding alert devices 20a, 20b (and the alert device of the third dock station 16c) to emit the warning signals 22a, 22b. Because the warning signals 22a, 22b are not emitted, a driver 70a of the vehicle 26a and/or a driver 70b of the vehicle 26b are informed that they can move their respective vehicles 26a, 26b without facing an imminent safety threat (e.g., the monitored safety concern condition is not present). In some examples, as shown in FIGS. 3A and 3B, to indicate that the drivers 70a, 70b can move their respective vehicles 26a, 26b, the alert output determiner 206 commands each of the alert devices 20a, 20b to emit the green light 68. In some examples, no such command is needed and the alert devices 20a, 20b default to green if no signal is received.

FIG. 4 is a top view of the example loading dock facility 34 of FIGS. 1A and 1B. FIG. 4A is a side view of the first dock station 16a and FIG. 4B is a side view of the second dock station 16b. In the example of FIGS. 4, 4A and 4B, the first vehicle brace 24a is in the first stored position (FIG. 4A), the second vehicle brace 24b is in a transition position (FIG. 4B), and the vehicle brace of the third dock station 16c is in the stored position. As noted above, the transition position is any position intermediate the stored position and the operative position. Multiple intermediate positions occur, for example, as a dock worker 18 manually moves the second vehicle brace 24b from the second stored position to the second operative position. The dock worker 18 manually moving the second vehicle brace 24b is an example of a condition monitored at the second dock station 16b. In the illustrated example, the first brace stored sensor 54a senses the first vehicle brace 24a in the stored position and, thus, issues, emits and/or sends the first stored signal 56a to the electronic controller 64. The vehicle brace stored position determiner 202 receives the first stored signal 56a and determines that the first vehicle brace 24a is in the stored position.

Additionally, the second brace stored sensor 54b of the illustrated example senses the absence of the second vehicle brace 24b and, thus, issues, emits and/or sends the second not stored signal. In turn, the vehicle brace stored position determiner 202 receives the second not stored signal and determines that the second vehicle brace 24b is not in a stored position. At the same time, the second brace operative sensor 58b senses the absence of wheel 62 thus issues, emits and/or sends the second not operative signal. In response, the vehicle brace operative position determiner 204 receives the second not operative signal and determines that the second vehicle brace 24b is not in the operative position. Because the second vehicle brace 24b is neither stored nor operative (as indicated by the presence of both the second not stored signal and the second not operative signal, the electronic controller 64 is alerted that the second vehicle brace 24b is in a second transition position.

In this example, because the second vehicle brace 24b is in a transition position, the vehicle brace stored position determiner 202 and the vehicle brace operative position determiner 204 receives neither the second stored signal 56b nor the second operative signal 60b, respectively. Consequently, the vehicle brace stored position determiner 202, the vehicle brace operative position determiner 204 and/or the alert output determiner 206 of the illustrated example determines that the second vehicle braces 24b is in a transition position. In turn, the alert output determiner 206 may command the alert devices 20a, 20b to emit the warning signals 22a, 22b (e.g., red lights, audible alarm and/or a combination thereof). When emitted, depending on other sensed conditions as explained below, the warning signals 22a, 22b inform both drivers 70a, 70b to not move (e.g., stop moving) their respective vehicles 26a, 26b (e.g., for the safety of dock worker 18). Thus, FIG. 4 illustrates how the first alert device 20a emits the first warning signal 22a in response to detection of a predefined condition at the second dock station 16b.

In some examples, the type of warning signal emitted when a vehicle brace is in the operative position may be different compared to the type of warning signal emitted when a vehicle brace is in a transition position. For example, in certain situations, the warning signal(s) 22a, 22b emitted when the vehicle braces 24a, 24b are in their transition positions may be audible signals (e.g., a horn) and the warning signals 22a, 22b emitted when the vehicle braces 24a, 24b are in their operative positions may be visual signals (e.g., red lights). In some examples, the warning signals 22a, 22b may be a combination of a visual signal (e.g., red lights) and an audible signal (e.g., a horn) when the vehicle braces 24a and/or 24b are in the transition positions.

Figure 5A:
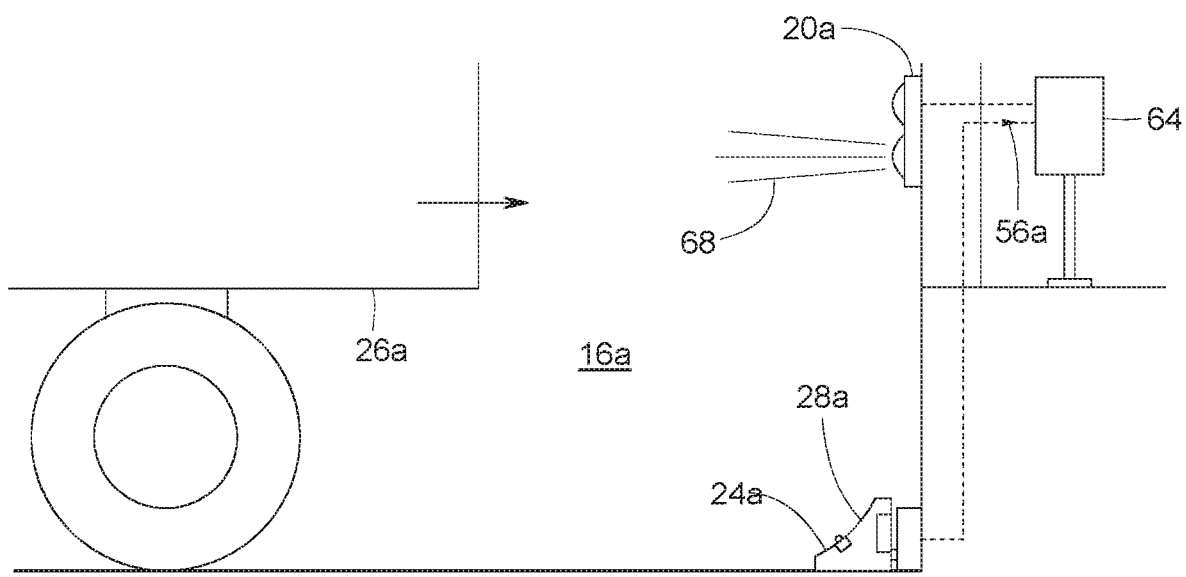
FIG. 5A is a right side view of the example first dock station shown in the state reflected in FIG. 5 with the first wheel chock in the stored position and showing the example first signaling device of the example first dock station emitting an example non-warning signal.
Figure 5B:
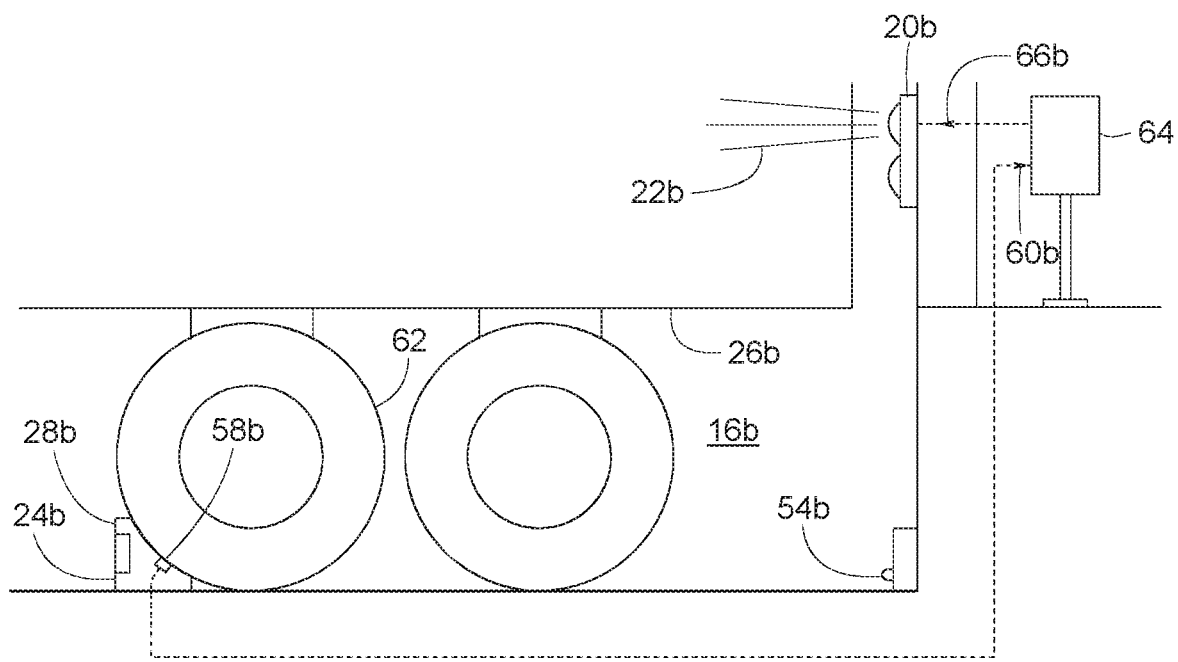
FIG. 5B is a right side view of the example second dock station shown in the state reflected in FIG. 5 with the second wheel chock in an example operative position and showing the example second signaling device of the example second dock station emitting an example warning signal.

FIG. 5 is a top view of the example loading dock facility 34 of FIGS. 1A and 1B illustrating another example scenario at the loading dock facility 34. FIG. 5A is a side view of the example first dock station 16a. FIG. 5B is a side view of the example second dock station 16b. FIGS. 5, 5A and 5B illustrate the first vehicle brace 24a in the stored position, the second vehicle brace 24b in an operative position, and the vehicle brace of the third dock station 16c in the stored position. When the second vehicle brace 24b is in the second operative position, it blocks and/or restricts movement of the vehicle 26b in a forward direction away from the second doorway 38b. When the vehicle brace 24b is in the second operative position, the second brace operative sensor 58b sends and/or outputs the second operative signal 60b. The vehicle brace operative position determiner 204 receives the second operative signal 60b and determines that the second vehicle brace 24b is in the second operative position. Since the second vehicle brace 24b is blocking movement of the vehicle 26b at the second dock station 16b, the alert output determiner 206 may send the second output signal 66b to command the second alert device 20b to emit the second warning signal 22b (e.g., a red light) to inform the driver 70b not to move the vehicle 26b away from the second doorway 38b. In some examples, the second warning signal 22b may be a different type of warning signal than the warning signal that is emitted when the vehicle brace of a dock or any adjacent dock is in a transition state (i.e., is not in either an operative or a stored position as shown in FIGS. 4, 4A and 4B). With the vehicle 26b in the second dock station 16b properly parked and blocked by the second vehicle brace 24b, and with the first vehicle brace 24a of the first dock station 16a in the first stored position, the alert output determiner 206 does not command the first alert device 20a to emit the first warning signal 22a. The look of such warning informs the driver 70a of the vehicle 26a positioned at the first dock station 16a that he can move his vehicle 26a. In some such examples, the alert output determiner 206 may command the first alert device 20a to emit a non-alert signal (e.g., the green light 68) when this condition exits.

The scenarios described above to control the first alert device 20a in response to certain conditions (including conditions at the first dock station 16a and conditions at the second dock station 16b) also applies to controlling the second alert device 20b in response to certain conditions (including conditions at the first dock station 16a and conditions at the second dock station 16b), but in the opposite sense (e.g., the vehicle 26b parked and blocked at the second dock station 16b, the alert device 20b at the second dock station 16b emitting a warning signal 22b to inform the driver of the vehicle 26b at the second dock station 16b of a situation at the first dock station 16a and/or the second dock station 16b). Moreover, in some examples, the monitoring and alerting system 10 disclosed herein are able to control the first alert device 20a in response to detecting certain conditions (e.g., a predetermined condition) in another adjacent or third dock station 16c, where first dock station 16a is positioned between the second dock station 16b and the third dock station 16c. For example, the first alert device 20a may be controlled to emit the warning signal 22a in response to a vehicle restraint of the third dock station 16c being in a transition position.

Although the alert output determiner 206 commands the first alert device 20a to provide the first warning signal 22a in response to a combination of conditions at the first dock station 16a and the second dock station 16b and commands the second alert device 20b to provide the second warning signal 22b in response to a combination of conditions at the first dock station 16a and the second dock station 16b, some examples of the monitoring and alerting system 10 are structured such that the first alert device 20a provides the first warning signal 22a in response to a state at the first dock station 16a without concern for conditions at the second dock station 16b, and the second alert device 20b provides the second warning signal 22b in response to a state at the second dock station 16b without concern for conditions at the first dock station 16a. Examples of a state at the first dock station 16a for which the first alert device 20a emits the first warning signal 22a (e.g., a red light) at the first dock station 16a without concern for conditions at the second dock station 16b include, but are not limited to, a dock leveler at the first doorway 38a not being in a proper position to receive the vehicle 26a backing into the first dock station 16a or release the vehicle 26a from the first dock station 16a, the first dock station 16a being out of service and thus closed to receiving any vehicles 26, and a motion sensor detecting a person on the first driveway path 42a of the first dock station 16a. Examples of a state at the second dock station 16b for which the second alert device 20b emits the second warning signal 22b (e.g., a red light) at the second dock station 16b without concern for conditions at the first dock station 16a include, but are not limited to, a dock leveler at the second doorway 38b not being in a proper position to receive the vehicle 26b backing into the second dock station 16b or release the vehicle 26b from the second dock station 16b, the second dock station 16b being out of service and thus closed to receiving any vehicles 26, and a motion sensor detecting a person on the second driveway path 42b of the second dock station 16b.

The first vehicle brace 24a and the second vehicle brace 24b of FIGS. 1A-1B, 3, 3-3B, 4, 4A-4B, 5, and 5A-5B are shown as wheel chocks 28a, 28b. However, the vehicle braces 24a, 24b may be implemented by any structure or device able to block a wheel 62 of a vehicle. For example, the vehicle brace may be implemented by a manually operated vehicle restraint, a barrier, a combination wheel chock and manually operated vehicle restraint, a portable trailer stand, etc. Some example implementations of wheel chocks are disclosed in U.S. Pat. Nos. 9,126,775; 8,307,956 and 6,092,970; all of which are hereby incorporated herein by reference. Some example implementations of manually operated vehicle restraints 30 are disclosed in U.S. Pat. Nos. 9,139,384; 9,010,501 and 8,590,673; all of which are hereby incorporated herein by reference. Some example implementations of a combination wheel chock and manually operated vehicle restraints are disclosed in U.S. Pat. Nos. 8,465,245 and 8,464,846; both of which are hereby incorporated herein by reference. An example implementation of a portable trailer stand is disclosed in US Published Patent Application 20140166950, which is hereby incorporated herein by reference. Other example implementations of wheel chocks, manually operated vehicle restraints, portable trailer stands, and/or combination wheel chock and manually operated vehicle restraints are permissible.

Figure 7:
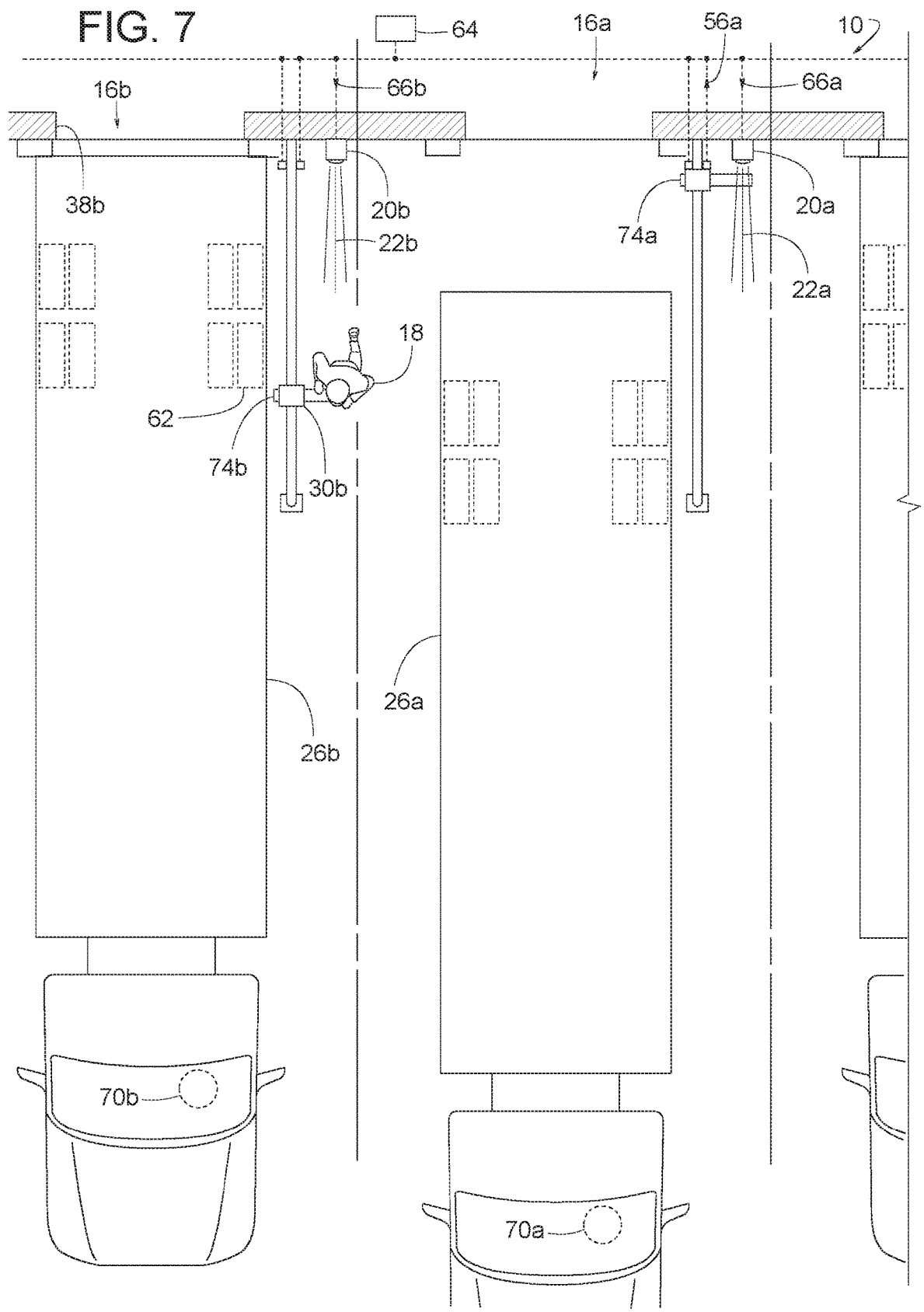
FIG. 7 is a top view of the system of FIG. 6 but showing an example first manually operated vehicle restraint of the example first dock station in an example stored position and an example second manually operated vehicle restraint of an example second dock station in an example transition position.

FIGS. 6-8 illustrate the vehicle braces 24a,24b implemented as manually operated vehicle restraints 30a and 30b. FIGS. 9A-9B, 10A-10B, and 11A-11B illustrate the vehicle braces 24a, 24b implemented as manually operated portable trailer stands 32a, 32b. Many of the components of FIGS. 6-8 and FIGS. 9A-9B, 10A-10B, and 11A-11B are substantially similar or identical to the components described above in connection with FIGS. 1A-1B. As such, those components will not be described in detail again below. Instead, the interested reader is referred to the above corresponding descriptions for a complete written description of the structure and operation of such components. To facilitate this process, similar or identical reference numbers will be used for like structures in FIGS. 6-8, 9A-B, 10A-B and 11A-B as used in FIGS. 1A-1B.

Referring to FIGS. 6-8, the example vehicle braces 24a, 24b are implemented by manually operated vehicle restraints (e.g., a first restraint 30a, a second restraint 30b). The restraints 30a, 30b of the illustrated example include a first barrier 74a and a second barrier 74b mounted to a first track 76a and a second track 76b, respectively. The tracks 76a and 76b are attached to respective first and second driveway paths 42a, 42b of the driveway 42. The tracks 76a, 76b are elongate in a direction substantially parallel to a lengthwise direction 78 of the driveway paths 42a, 42b. The barriers 74a, 74b are manually movable relative to their respective tracks 76a, 76b between a stored position and an operative position. For example, the first barrier 74a is manually movable along a length 80 of the track 76a, which allows the first barrier 74a to be positioned at various desired distances away from the front of the building 36. The barrier 74a can also move in a lateral direction 82 to selectively block and release the vehicle 26a. The lateral direction 82 is substantially perpendicular to the lengthwise direction 78. The above description also applies to the second barrier 74b and will not be repeated to avoid redundancy.

Referring to FIGS. 9A-11B, the example vehicle braces 24a, 24b are implemented as a first manually operated trailer stand 32a and a second manually operated trailer stand 32b. The first and second trailer stands 32a, 32b of FIGS. 9A-11B are adapted to provide the vehicles 26a and/or 26b with vertical support (e.g., when the prime mover is moved from the trailer, a trailer stand may be positioned to prevent the trailer from nosediving or otherwise lurching forward). Each of the first and second trailer stands 32a, 32b of the illustrated example includes an upward facing surface 88 that can be jacked up or moved to engage an underside surface 90 of a trailer of a respective one of the vehicles 26a, 26b to support a front end 92 of the trailer 94. The first and second trailer stands 32a, 32b enable a tractor (e.g., a prime mover, a cab or the like) portion 96 of the vehicles 26a, 26b to separate from the trailer 94 and leave the trailer 94 at the respective first or second dock stations 16a,16b for loading and/or unloading operations. In the illustrated example, each of the first and second trailer stands 32a, 32b has wheels 98 for portability.

Figure 10A:
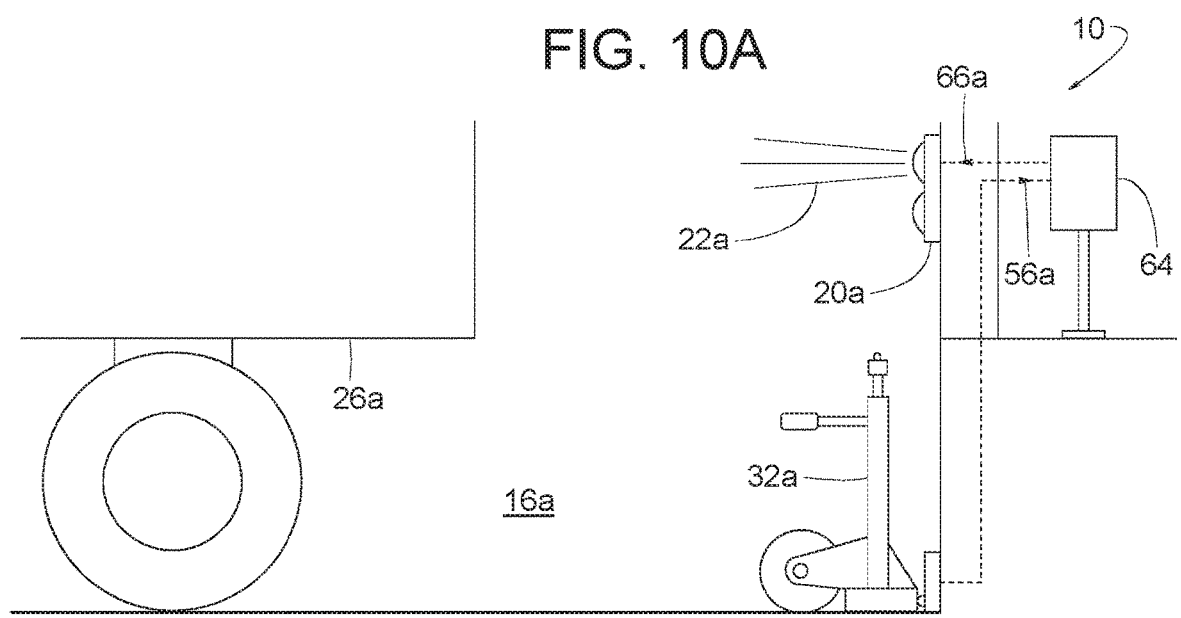
FIG. 10A is a right side view of the example first dock station of the loading dock system of FIGS. 4 and 4A showing the example first portable trailer stand in the example stored position and the example first signaling device of the example first dock station emitting an example warning signal.
Figure 10B:
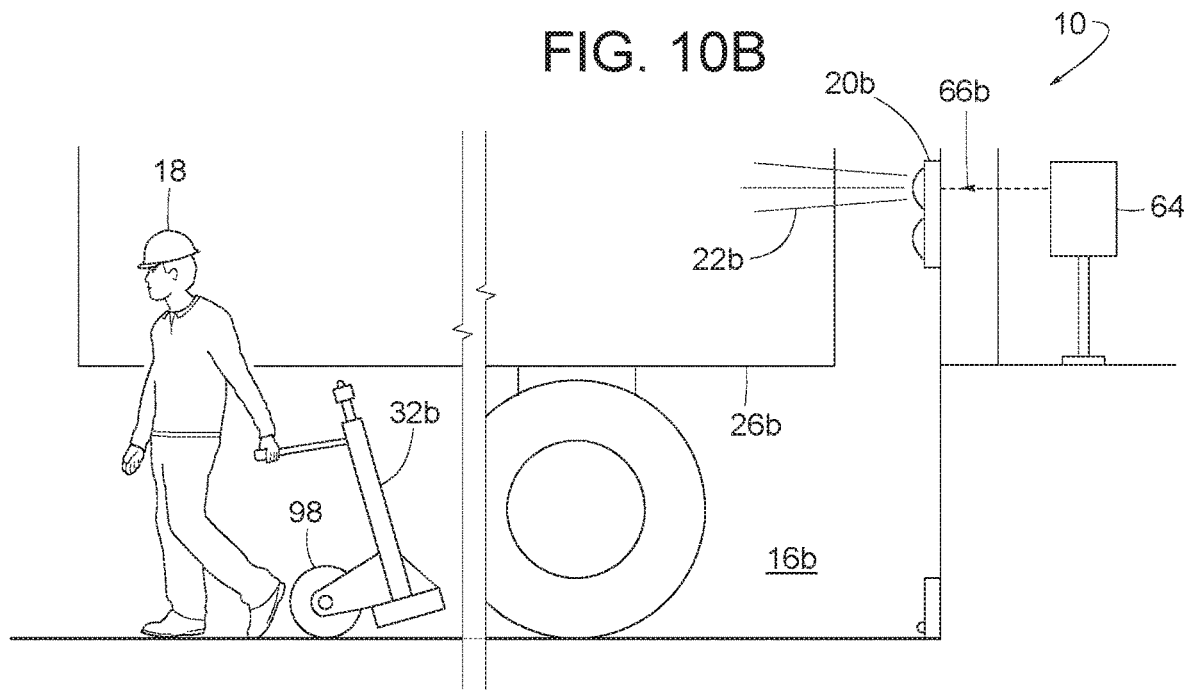
FIG. 10B is a right side view of the example second dock station of the loading dock system of FIGS. 4 and 4B showing the example second portable trailer stand in an example transition position and the example second signaling device of the example second dock station emitting an example warning signal.

The example monitoring and alerting system 10 of FIGS. 6-8 and 9A-11B operates substantially the same as described in connection with FIGS. 1A-1B, 3, 3A-3B, 4, 4A-4B, 5, 5A-5B. For example, FIGS. 6-8 correspond to the example conditions of FIGS. 3-5, respectively. For example, FIGS. 9A-9B correspond to the example conditions of FIGS. 3, 3A and 3B. FIGS. 10A-10B correspond to the example conditions of FIGS. 4, 4A and 4B. FIGS. 11A-11B correspond to the example conditions of FIGS. 5, 5A and 5B. Therefore, that description will not be repeated.

Figure 12A:
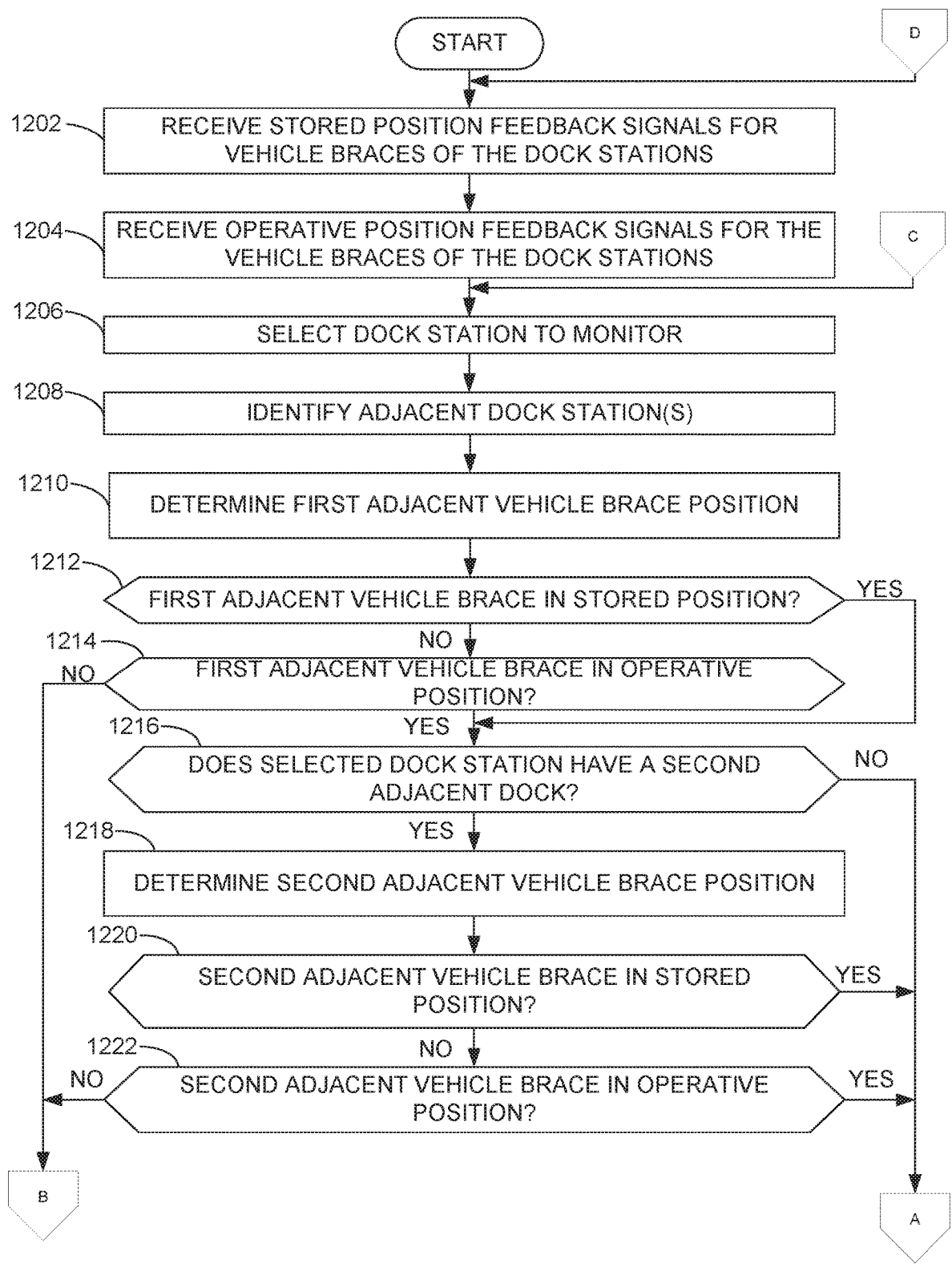
FIGS. 12A and 12B are flowcharts representative of example machine readable instructions that may be executed to implement the example electronic controller of FIG. 2.
Figure 12B:
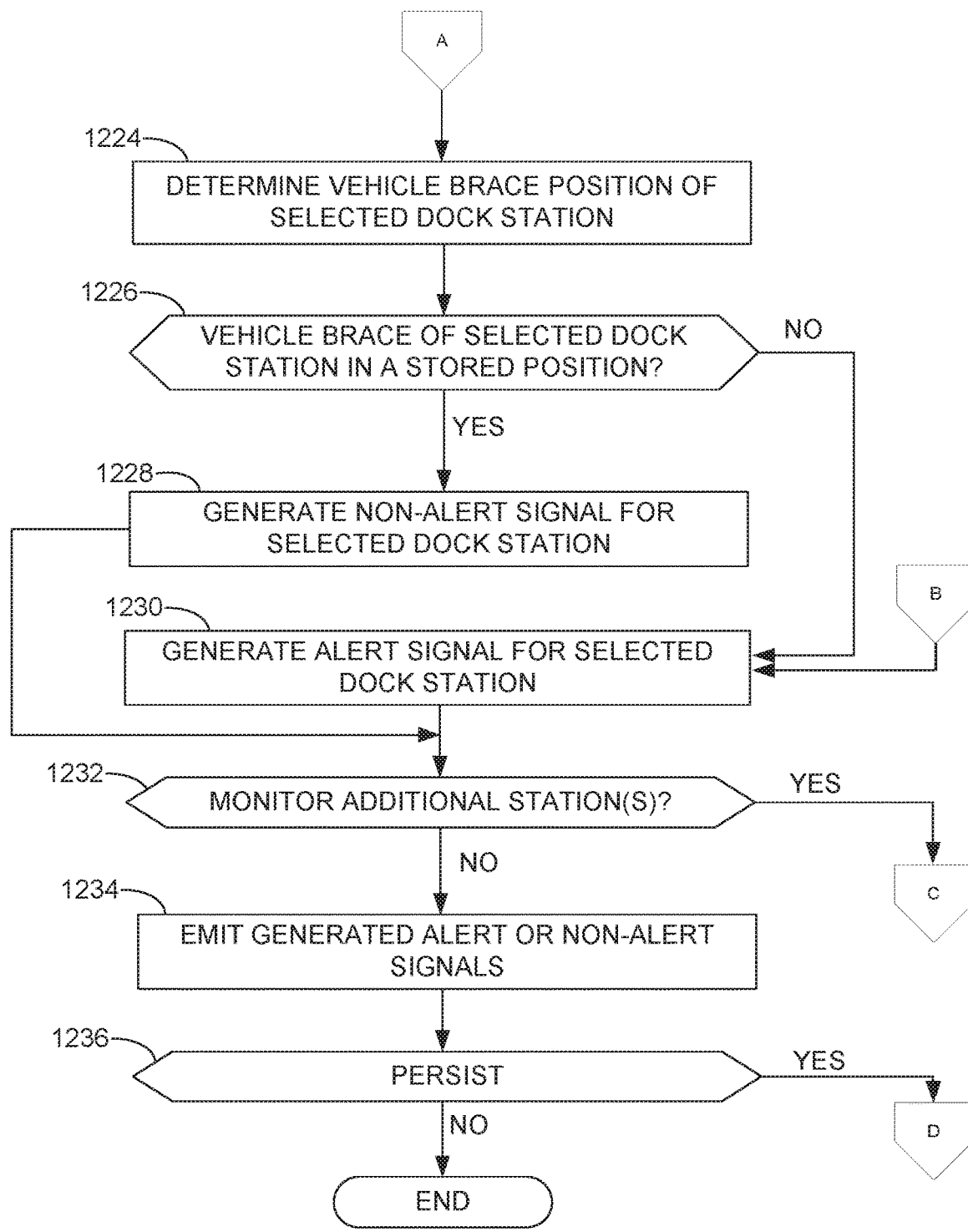
Figure 13:
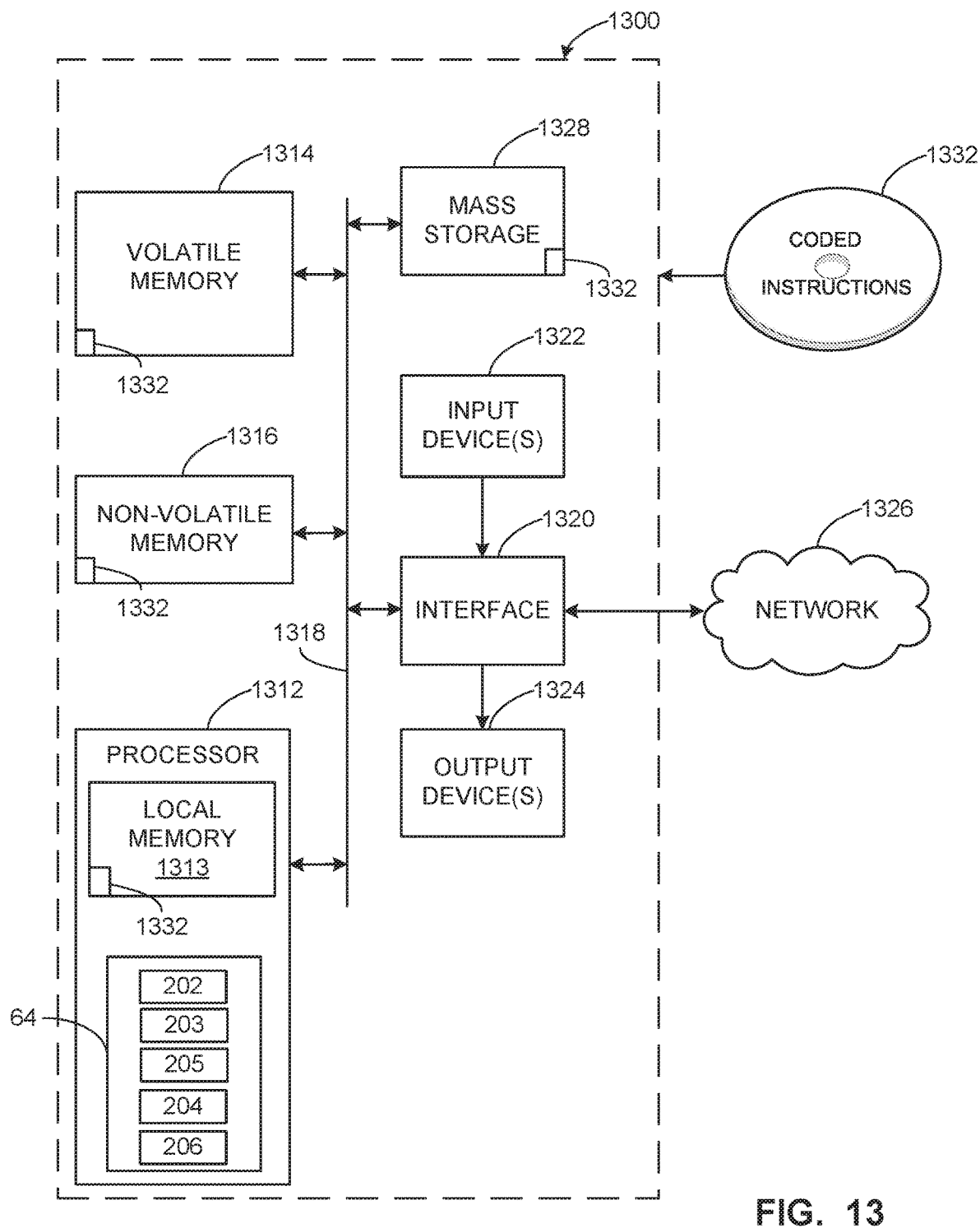
FIG. 13 illustrates an example processor platform structured to execute the instructions of FIGS. 12A and 12B to implement the example electronic controller of FIG. 2.
Figure 14C:
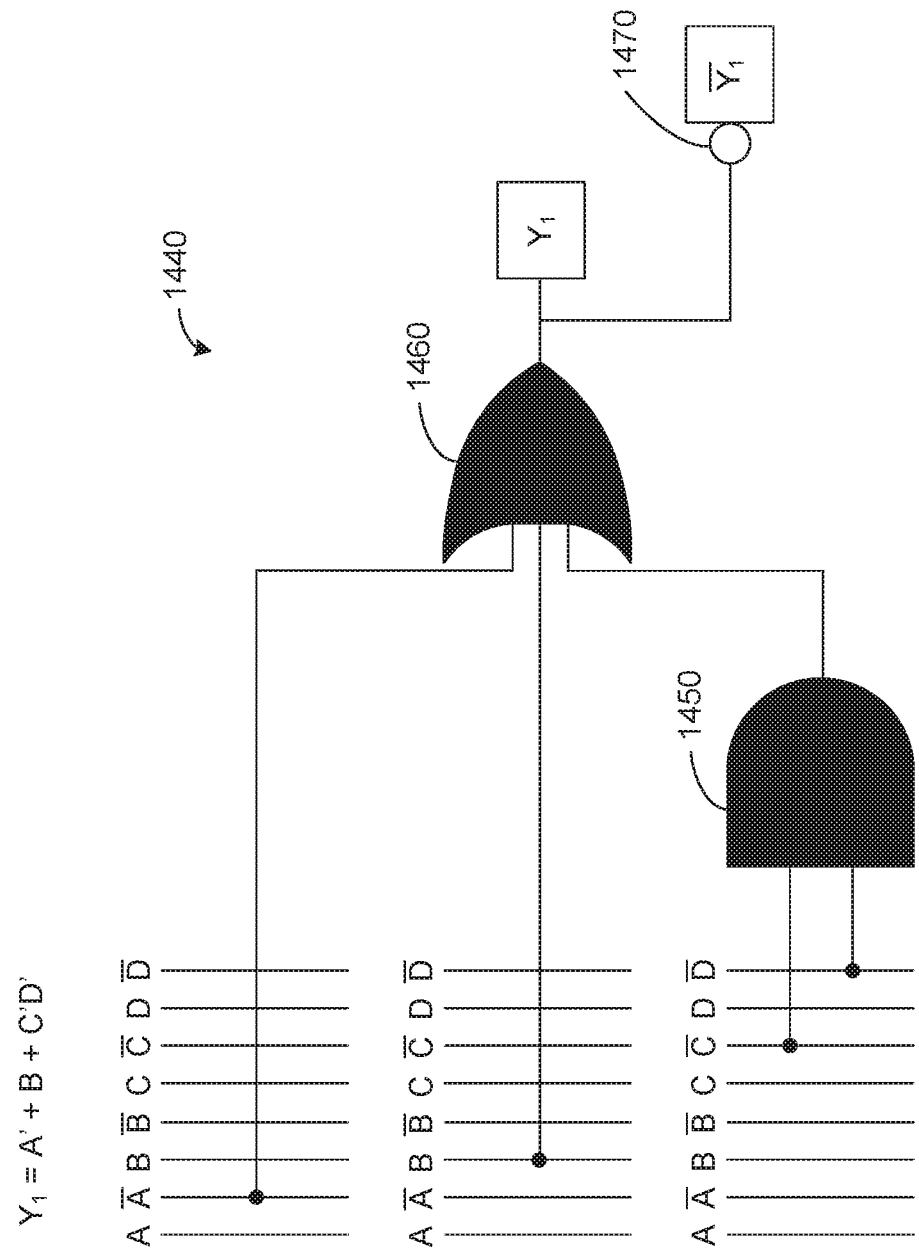
FIG. 14C is a schematic illustration of an example control circuit implementing the electronic controller of FIG. 2 in accordance with the logic reflected in the example truth table of FIG. 14B.
Figure 15C:
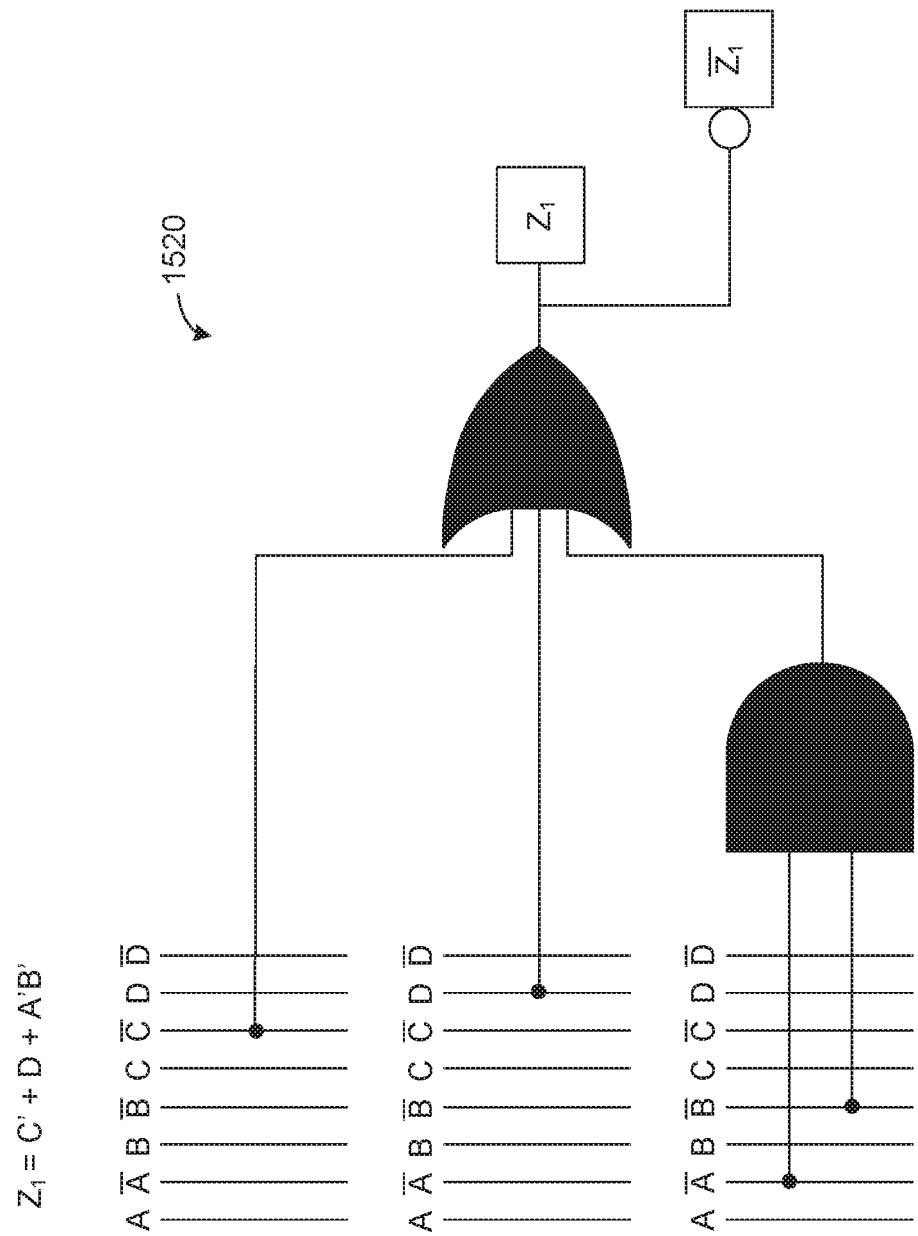
FIG. 15C is a schematic illustration of an example control circuit implementing the electronic controller of FIG. 2 in accordance with the logic reflected in the example truth table of FIG. 15B.
Figure 16A:
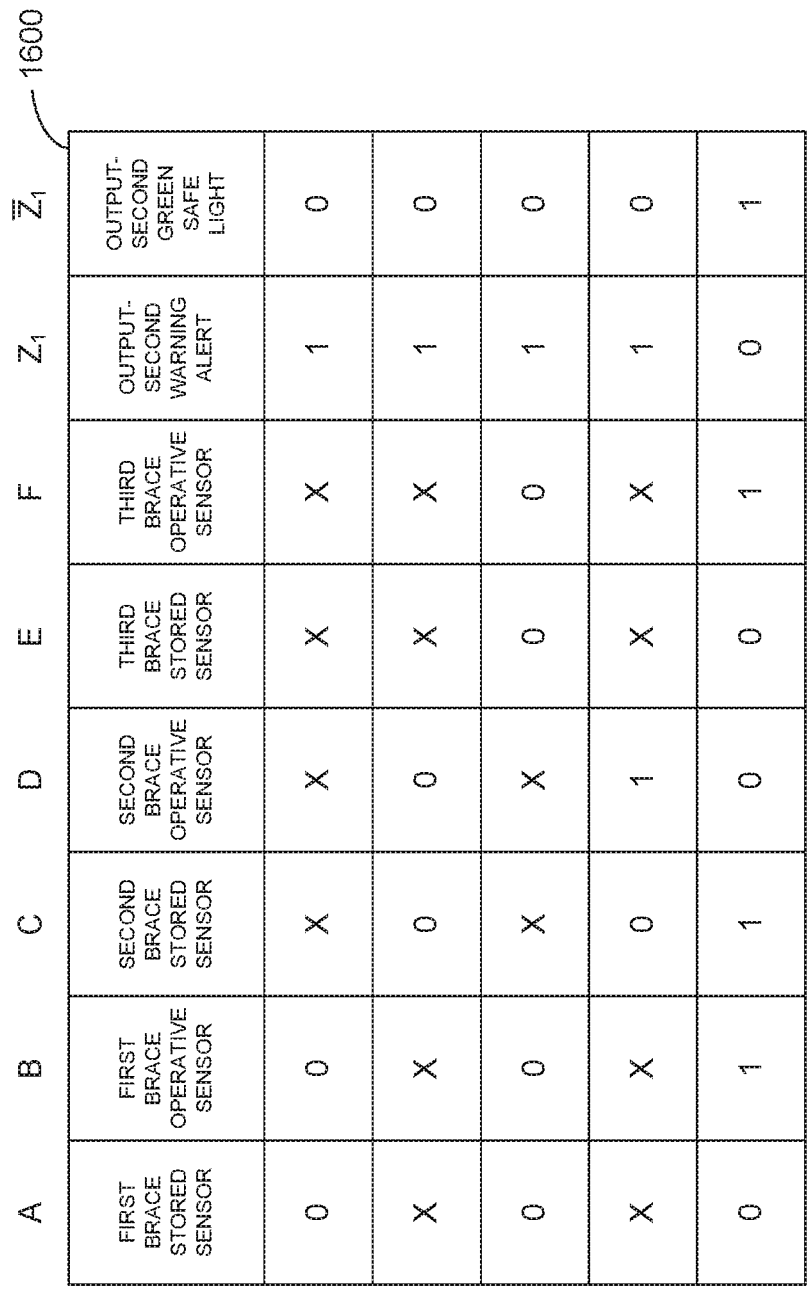
FIG. 16A depicts an example logic table reflecting example input and output relationships for an example configuration of sensors of the first example dock station, the second example dock station, and a third example dock station, and the example alert device of the second dock station.
Figure 16C:
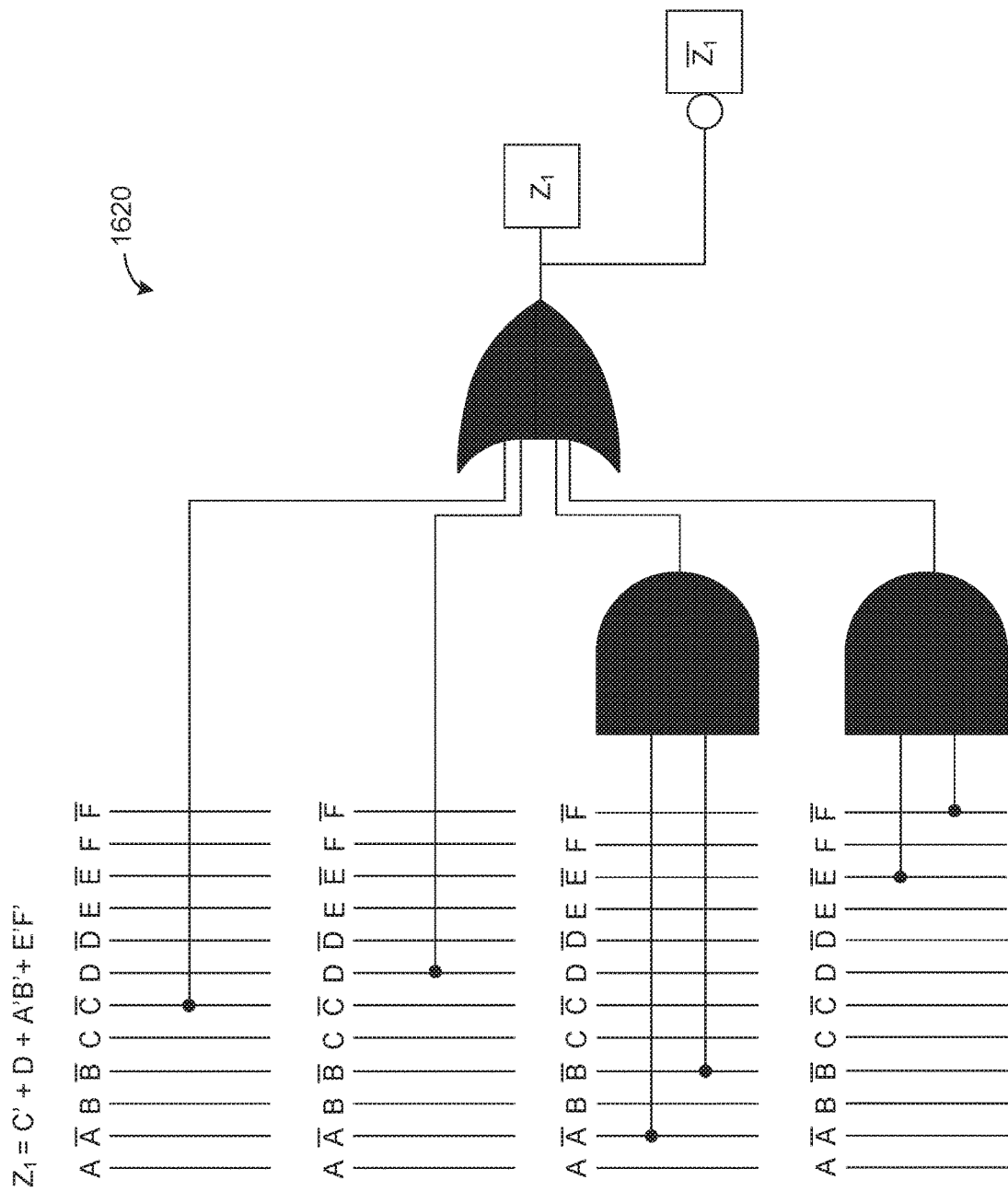
FIG. 16C is a schematic illustration of an example control circuit implementing the electronic controller of FIG. 2 in accordance with the logic reflected in the example truth table of FIG. 16B.

As noted above, the electronic controller 64 may be implemented using one or more of the processing platforms 1300 of FIG. 13, one or more of the logic circuits 1440, 1520, 1620 of FIGS. 14C and 15C, 16C etc., and/or a combination thereof. Flowcharts representative of example hardware logic or machine readable instructions for implementing the electronic controller 64 of FIG. 2 is shown in FIGS. 12A and 12B. The machine readable instructions may be a program or portion of a program for execution by a processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 12A and 12B, many other methods of implementing the example electronic controller 64 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 12A and 12B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program of FIGS. 12A and 12B begins with the example electronic controller 64 receiving stored position feedback signals 56a-b for vehicle braces 24 (e.g., the wheel chocks 28a-b, the barriers 74a-b, the trailer stands 32a-b) of the dock stations 16a-c (block 1202). For example, the vehicle brace stored position determiner 202 may receive the stored signal 56a from the first brace stored sensor 54a associated with the vehicle brace 24a of the first dock station 16a, the stored signal 56b from the second brace stored sensor 54b associated with the vehicle brace 24b of the second dock station 16b, the third stored brace feedback signal from the stored sensor associated with the vehicle brace 24c of the third dock station 16c, etc. For example, the vehicle brace stored position determiner 202 may determine the values of the inputs depicted below in connection with FIGS. 14A-C, 15A-C, and 16A-C.

The example electronic controller 64 receives operative signals (e.g., the operative signals 60a and 60b) for the vehicle braces 24 of the dock stations 16a-c (block 1204). For example, the vehicle brace operative position determiner 204 may receive the operative signal 60a from the brace operative sensor 58a associated with the vehicle brace 24a of the first dock station 16a, the operative signal 60b from the brace operative sensor 58b associated with the vehicle brace 24b of the second dock station 16b, the operative signal from the brace operative sensor associated with the vehicle brace of the third dock station 16c, etc.

The example electronic controller 64 selects a dock station to monitor (block 1206). For example, the dock station selector 203 selects a dock station of the dock stations 16a-c for which to determine an alert output. This can be thought of as selecting a dock station for analysis as the primary dock station. In this example, the electronic controller 64 will iteratively perform the analysis with a different dock station considered as the primary station for each respective iteration. After identifying a dock station as the primary dock station for the corresponding iteration of analysis, the adjacent dock identifier 205 then identifies the dock stations 16b-c that are located adjacent to the selected dock station (block 1208). In the hardware implementation described below, in response to the adjacent dock identifier 205 determining that the dock station 16b has one adjacent dock station (e.g., the second dock station 16a), one or more of the logic circuits 1440, 1520 of FIGS. 14C and 15C may be used. In another example, in response to the adjacent dock identifier 205 determining that the dock station 16a has two adjacent dock stations (e.g., the dock stations 16a, 16c), the logic circuit 1620 of FIG. 16C may be used.

Returning to FIG. 12A, the example electronic controller 64 determines a position of a vehicle brace 24b of a dock station 16b adjacent the selected dock station 16a (block 1210). For example, the vehicle brace stored position determiner 202 and the vehicle brace operative position determiner 204 interpret the stored signal(s) 56b received from the second brace stored sensors 54b and the operative signal(s) 60b received from the second brace operative sensor 58b of the adjacent dock station 16b to determine the position of the vehicle brace 24b of the adjacent dock station 16b.

The example electronic controller 64 determines if the vehicle brace 24b of the adjacent dock station 16b is in a stored position (block 1212). For example, if the vehicle brace 24b of the adjacent dock station 16b is not in a stored position, the example electronic controller 64 determines if the vehicle brace 24*b* of the adjacent dock station 16*b* is in an operative position (block 1214). For example, the vehicle brace operative position determiner 204 determines if the vehicle brace 24*b* of the adjacent dock station 16*b* is in the operative position. If the vehicle brace operative position determiner 204 determines at block 1214 that the vehicle brace 24*b* is not in the operative position, then the example electronic controller 64 emits a second alert at the selected dock station 16*a* (block 1232). For example, the alert output determiner 206 provides the output signal 66*a* to emit the second alert (e.g., an audible alarm) at the selected dock station 16*a*.

In response to the vehicle brace 24*b* being in a stored position (block 1212) or the vehicle brace 24*b* being in an operative position (block 2114), control transfers to block 1216. The example electronic controller 64 determines if the selected dock station 16*a* has another adjacent dock station 16*c* (block 1216). For example, the adjacent dock identifier 205 determines if another adjacent dock station 16*c* is associated with the selected dock station 16*a*. If the adjacent dock identifier 205 determines (block 1216) that the selected dock station 16*a* does not have another adjacent dock station, control transfers to block 1224. If the adjacent dock identifier 205 determines (block 2116) that the selected dock station 16*a* has another adjacent dock station, control transfers to block 1218.

The example electronic controller 64 determines a position of a vehicle brace of the other adjacent dock station 16*c* (block 1218). For example, the vehicle brace stored position determiner 202 and the vehicle brace operative position determiner 204 interpret the stored position feedback signal(s) and the operative position feedback signal(s) received from the adjacent dock station 16*c* to determine the position of the vehicle brace of the adjacent dock station 16*c*. If the vehicle brace stored position determiner 202 determines that the vehicle brace of the adjacent dock station 16*c* is in a stored position (block 1220), control transfers to block 1224.

If the brace stored position determiner 202 determines that the vehicle brace of the adjacent dock station 16*c* is not in a stored position (block 1220), the example electronic controller 64 determines if the vehicle brace of the adjacent dock station 16*c* is in an operative position (block 1222). If the vehicle brace operative position determiner 204 determines that the vehicle brace of the other adjacent dock station 16*c* is not in the operative position (block 1222), then the example electronic controller 64 emits a second alert at the selected dock station 16*a* (block 1232). For example, the alert output determiner 206 provides the output signal 66*a* to emit a second alert (e.g., an audible alarm) at the selected dock station 16*a*. If the vehicle brace of the adjacent dock station 16*c* is in the operative position (block 1222), control transfers to block 1224.

At block 1224, the example electronic controller 64 determines the vehicle brace position of the vehicle brace 24*a* associated with the selected dock station 16*a* (block 1224). For example, the vehicle brace stored position determiner 202 and the vehicle brace operative position determiner 204 interpret the stored position feedback signal(s) received from the first brace stored sensor 54*a* and the operative signal(s) 60*a* received from the brace operative sensor 58*a*.

If the vehicle brace 24*a* of the selected dock station 16*a* is in a stored position (block 1226), the example electronic controller 64 generates a non-alert signal for the selected dock station 16*a*. For example, the alert output determiner 206 determines that an alert is not necessary based on the vehicle brace positions of the selected dock station 16*a* and the adjacent dock stations 16*b-c*. In some such examples, the non-alert signal may be a green light (e.g., displayed via the first alert device 20*a*).

If the vehicle brace 24*a* of the selected dock station 16*a* is not in a stored position (block 1226), the example electronic controller 64 generates an alert signal for the selected dock station 16*a* (block 1230). For example, if the vehicle brace 24*a* of the selected dock station 16*a* is not in the stored position, then the first alert device 20*a* of the selected dock station 16*a* outputs an alert or warning signal. For example, the alert output determiner 206 commands the first alert device 20*a* via the warning signal 22*a* to emit an alert at the selected dock station 16*a*. For example, the alert may be emitted via the first alert device 20*a* to indicate, for example, that a driver should not attempt to move the vehicle from the selected dock station. In such examples, the first warning signal 22*a* may be a red light.

Alternatively, in some examples, the electronic controller 64 can determine if the first vehicle brace 24*a* is in the operative position, stored position, or the transition position and generate appropriate warning or alert outputs for the determined position. If the vehicle brace 24*a* of the selected dock station 16*a* is determined to be in the operative position, the electronic controller 64 commands the first alert device 20*a* via the warning signal 22*a* to emit a first alert. If the vehicle brace 24*a* of the selected dock station 16*a* is determined not to be in the operative position or the stored position, the electronic controller 64 determines that the vehicle brace 24*a* is in the transition position and commands the first alert device 20*a* (e.g., via the warning signal 22*a*) to emit a second alert different than the first alert. If the vehicle brace 24*a* of the selected dock station 16*a* is determined to be in the stored position, the electronic controller 64 commands the first alert device 20 to emit a non-warning signal (e.g., the green light 68). In some such examples, the first alert provided by the warning signal 22*a* may be a visual alarm. In some such examples, the second alert provided by the warning signal 22*a* may be an audible alarm. In some examples, the second alert provide via the warning signal 22*a* may be a combination of a red light and an audible alarm (e.g., a siren).

The electronic controller 64 determines if additional dock stations require monitoring (block 1232). For example, the electronic controller 64 may be programmed with the number of dock stations at a loading dock facility (e.g., the loading dock facility 34). If the electronic controller 64 determines that additional dock stations are to be monitored (block 1232), the control returns to block 1206. For example, the electronic controller 64 may determine (e.g., via a counter) if all of the (e.g., preprogrammed) number of dock stations have been analyzed as the primary dock station.

If the electronic controller 64 determines that all of the dock stations have been analyzed as the primary dock station (block 1232), the electronic controller 64 emits the generated alert or non-alert signals (block 1234). For example, the alert output determiner 206 commands the alert devices of corresponding dock stations to emit either the generated alert signals or non-alert signals. For example, the alert output determiner 206 commands the first alert device 20*a* via the warning signal 22*a* to emit a generated alert/non-alert signal at the selected dock station 16*a*, commands the second alert device 20*b* via the warning signal 22*b* to emit a generated alert/non-alert signal at a second dock station 16*b*, commands the third alert device via the warning signal to emit a generated alert/non-alert signal at the third dock station 16*c*, etc.

The electronic controller 64 determines if the monitoring and alerting system 10 should persist (block 1236). For example, the electronic controller 64 may determine to discontinue monitoring the monitoring and alerting system 10 based on user input, receiving continuing communication (e.g., a communication heartbeat signal, sensor information, etc.), etc. If the electronic controller 64 determines at block 1236 that alerting and monitoring are to continue (e.g., the monitoring and alerting system 10 should persist), control returns to block 1202. If the electronic controller 64 determines that the monitoring and alerting system 10 should not continue (block 1236), the program 1200 ends.

FIG. 13 is a block diagram of an example processor platform 1300 structured to execute the instructions of FIGS. 12A and 12B to implement the electronic controller 64 of FIG. 2. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example vehicle brace stored position determiner 202, the example vehicle brace operative position determiner 204, the example dock station selector 203, the adjacent dock identifier 205, and the example alert output determiner 206.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1332 of FIGS. 12A and 12B may be stored in the mass storage device 1328, in the volatile memory 1314, in the non-volatile memory 1316, and/or on a removable non-transitory computer readable storage medium such as a CD or DVD.

A second manner of implementing the electronic controller 64 of FIGS. 1A-1B and/or 2 is described in FIGS. 14A-14C and 15A-15C. In the second example, the electronic controller 64 is implemented by one or more logic circuits constructed to respond to the states of the sensors (e.g., the brace stored sensors 54a and 54b, the brace operative sensors 58a and 58b, etc.) to drive one or more output devices (e.g., the first alert device 20a, the second alert device 20b, etc.). The logic circuitry of the second example implementation of the electronic controller 64 operates to identify output signals to control the output devices at the various dock stations based on input signals corresponding to the outputs of the sensors at the various dock stations.

To construct such logic circuitry, a truth table of the described relationship between sets of inputs and the output signals that are the result is constructed. An example of such a truth table is shown in FIG. 14B. For ease of explanation, the truth table of the illustrated example focuses on the inputs from the sensors of two dock stations (e.g., the first brace stored sensor 54a and the first brace operative sensor 58a from the first dock station 16a, and the second brace stored sensor 54b and the second brace operative sensor 58b from the second dock station 16b). The example truth table of FIG. 14B illustrates the outputs to occur at the first dock station 16a (e.g., the output signal 66a to drive the first alert device 20a at the first dock station 16a). A second truth table illustrating the relationship between the second inputs and the truth table of FIG. 15B, and the outputs to occur at the second dock station 16b is presented in FIG. 15B. Thus, in FIGS. 14B and 115B, the first dock station 16a is considered the primary dock station. It is to be understood that the truth tables and other logic circuits to implement such truth tables exist for other relationships (e.g., when the sensor outputs of the first dock station are to affect the alert outputs at a third dock station 16c and vice versa).

The logic circuits may operate based on a Boolean logic model or having certain logic inputs generate certain logic outputs. The analog inputs may come from the sensors at the various dock positions described above. The outputs of the sensors may be analog signals. Then, the electronic controller 64 may include analog-to-digital converters to generate digital values (e.g., 1 or 0) based on signals received from the sensors. The logic circuits may include one or more logic gates that operate on the digital input values to generate corresponding outputs. The outputs of the logic gates may be converted to analog signals by digital-to-analog converters, amplified by one or more amplifiers, and transmitted by one or more transmitters to output devices (e.g., the first alert device 20a, the second alert device 20b, etc.) located at one or more of the dock stations (e.g., the first dock station 16a, the second dock station 16b, etc.).

In some examples, the sensors output digital signals and, thus, the analog-to-digital converters are not needed at the electronic controller 64. In some examples, the output devices at the dock stations can be driven by digital signals and, thus, digital-to-analog converters are not needed at the electronic controller 64.

The logic circuit of this example may be implemented in dedicated hardware circuitry, in a field programmable gate array (FPGA), in an application-specific integrated circuit (ASIC), and/or any other circuitry.

FIG. 14A depicts an example logic table 1400 reflecting inputs for various ones of the sensors disclosed above and corresponding outputs of the first alert device 20a of the first dock station 16a when the first dock station 16a is analyzed as the primary dock station. For example, the inputs of this example are from the brace stored sensors 54a and 54b and the brace operative sensors 58a and 58b of the dock stations 16a-b of FIGS. 1A-1B. In the illustrated example of FIG. 14A, the example logic table 1400 includes Boolean values to represent the status of the example inputs. Thus, a "1" represents "true," a "0" represents "false," and an "X" represents "don't care." In the don't care condition, the corresponding input has no effect on the resulting output(s). For example, a value of "1" for the first brace stored sensor 54a corresponds to the first brace stored sensor 54a identifying the first vehicle brace 24a being in the stored position. Similarly, in the illustrated example of FIG. 14A, the example logic table 1400 includes Boolean values to represent the status of the example outputs corresponding to the example inputs. For example, a value of "1" corresponds to an enabled output status while a value of "0" corresponds to a disabled output status. For example, a value of "1" for the first warning alert corresponds to the warning signal 22a of the first alert device 20a being activated, enabled, engaged, illuminated, etc. In another example, a value of "1" for the first green safe light corresponds to the first green safe light 66 of the first alert device 20a being activated, enabled, engaged, illuminated, etc.

In the table of FIG. 14A, the inputs of a given row result in the outputs reflected in that same row. Thus, each row represents a possible condition and the results as driven by the electronic controller 64. For example, row 1410 corresponds to a condition in which the first and second stored brace sensors sense a brace in the stored position and, thus, output a "true" signal (i.e., logic value 1). In addition, the first and second brace operative sensors do not detect a brace in the corresponding operative position. Accordingly, the first and second brace operative sensors output a "false" signal (i.e., logic value 0). In response to these sensor outputs (i.e., A=1, B=0, C=1, and D=0), the electronic controller 64 determines the first warning alert is not to be activated (e.g., logic value 0 in column $Y_1$) and the first green safe light is to be activated (e.g., logic value 1 in column $\overline{Y}_1$). As such, the control system 64 sends a signal (e.g., an analog or a digital signal) to the green safe light, that causes the green safe light to light up to notify the driver of the vehicle at the corresponding bay that it is safe to move the vehicle. As depicted in the illustrated example of FIG. 14A, the logic values corresponding to the first warning alert and the first green safe light are linked by a "not" operator and are therefore designated by $Y_1$ and $\overline{Y}_1$, respectively. For example, in the first row 1410, the logic value of "0" for the first warning alert translates to the logic value of "1" for the first green safe light.

In the illustrated example of FIG. 14A, a second row 1420 corresponds to a condition in which the first brace stored sensor either senses or does not sense a brace in the stored position and the second brace stored sensor does not sense a brace in the stored position and, thus, outputs a "false" signal (e.g., a value 0). In the second row 1420, the first warning alert is enabled based on the second brace stored sensor and the second brace operative sensor being disabled. As depicted in the example logic table 1400, a sensor is determined to be in motion, transit, etc., between a stored position and an operative position when a brace stored sensor and a corresponding brace operative sensor are disabled. For example, as reflected in the second row 1420, the second vehicle brace is determined to be in transit based on the second brace stored sensor and the second brace operative sensor being disabled. In response to the second vehicle brace being in transit, the logic values of the first brace stored sensor and the first brace operative sensor are not output determinate (e.g., do not affect the output logic value) and are thus designated with don't care values denoted by an "X." For example, the first warning alert is enabled in response to the second brace stored sensor and the second brace operative sensor being disabled and, thus, the values of the first brace stored sensor and the first brace operative sensor may be either "1" or "0."

FIG. 14B depicts an example truth table 1430 based on the example logic table 1400 of FIG. 14A. The example truth table 1430 includes the example inputs of the example logic table 1400 as designated by A-D in the corresponding columns and headings. In the illustrated example of FIG. 14B, the values in the A column correspond to the logic values of the first braced stored sensor of the example logic table 1400 of FIG. 14A. Further, the values in the B-D columns correspond to the logic values of the first brace operative sensor, the second brace stored sensor, and the second brace operative sensor of the example logic table 1400 of FIG. 14A, respectively. Further depicted in FIG. 14B, the example truth table 1430 includes example outputs designated by $Y_1$ and $\overline{Y}_1$. In the illustrated example of FIG. 14B, the values in the $Y_1$ correspond to the logic values of the first warning alert output of the example logic table 1400 of FIG. 14A. Further, the values in the $\overline{Y}_1$ column correspond to the logic values of the first green safe light output of the example logic table 1400 of FIG. 14A.

FIG. 14C is a schematic illustration of an example control circuit 1440 implemented using example logic gates corresponding to the example truth table 1430 of FIG. 14B. For example, using truth table conversion methods such as generating and analyzing Karnaugh maps, performing Boolean algebra, etc., an example Boolean expression as described below in Equation (1) may be generated to represent the relationships described in the truth table 1430 of FIG. 14B.

$$Y_1 = \overline{A} + B + \overline{CD} \quad \text{Equation (1):}$$

Alternatively, other Boolean expressions may be generated based on the truth table 1430 of FIG. 14B. In the illustrated example of Equation (1) above, the output $Y_1$ corresponds to the first warning alert output depicted in FIGS. 14A-B. In the illustrated example of Equation (1) above, the lines above the letter designators represent NOT operators. For example, $\overline{A}$ corresponds to A not (i.e., if A is logic 1, $\overline{A}$ is logic 0 and vice versa). Further depicted in FIG. 14C, the output $\overline{Y}_1$ corresponds to the first green safe light output depicted in FIGS. 14A-B.

In the illustrated example of FIG. 14C, the control circuit 1440 is implemented by an AND gate 1450 and an OR gate 1460. The AND gate 1450 of the illustrated example represents a Boolean operator that generates an output based on the inputs $\overline{C}$ and $\overline{D}$. In the illustrated example of FIG. 14C, the OR gate 1460 obtains the output of the AND gate 1450, and the inputs $\overline{A}$ and B to generate the output $Y_1$. In the illustrated example of FIG. 14C, the output $\overline{Y}_1$ is generated by applying a NOT operator 1470 to the output $Y_1$.

FIG. 15A depicts an example logic table 1500 reflecting inputs for various ones of the sensors disclosed above and corresponding outputs of the second alert device 20b of the second dock station 16b when the second dock station 16b is not the primary dock station, but instead is an adjacent station. For example, the logic table 1500 of the illustrated example corresponds to outputs of the second alert device 20b of the second dock station 16b based on inputs from the brace stored sensors 54a and 54b and the brace operative sensors 58a and 58b of the dock stations 16a and 16b of FIGS. 1A-1B. In the illustrated example of FIG. 15A, the example logic table 1500 includes Boolean values to represent the status of the example inputs A-D and the example outputs $Z_1$ and $\overline{Z_1}$. In the illustrated example, the output $Z_1$ represents the second warning alert corresponding to the warning signal 22b of the second alert device 20b of the second dock station 16b and the output $\overline{Z_1}$ represents the green light 68 of the second alert device 20b.

FIG. 15B depicts an example truth table 1510 based on the example logic table 1500 of FIG. 15A. FIG. 15C is a schematic illustration of an example control circuit 1520 implemented using example logic gates corresponding to the example truth table 1510 of FIG. 15B. For example, using truth table conversion methods such as generating and processing Karnaugh maps, performing Boolean algebra, etc., an example Boolean expression as described below in Equation (2) may be generated to represent the truth table of FIG. 15B $$Z_1 = \overline{C} + D + \overline{AB}$$ Equation (2):

Alternatively, other Boolean expressions may be generated based on the truth table of FIG. 15B. In the illustrated example of Equation (2) above, the output $Z_1$ corresponds to the second warning alert output depicted in FIGS. 15A-B, which represents the status of the warning signal 22b of the second alert device 20b of the second dock station 16b.

FIG. 16A depicts an example logic table 1600 reflecting inputs for various ones of the sensors of the above disclosed first through the third example dock stations 16a-c, and corresponding outputs of the second alert device 20b of the second dock station 16b. For example, the logic table 1600 may correspond to an example where the second dock station 16b is the primary dock station to be monitored and/or analyzed. In FIG. 16A, the example logic table 1600 corresponds to an example where a dock station such as the example second dock station 16b is determined to have two adjacent dock stations (e.g., the first dock station 16a and the third dock station 16c). For example, the logic table 1600 of the illustrated example corresponds to outputs of the second alert device 20b of the second dock station 16b based on (1) inputs from the brace stored sensors 54a and 54b of the dock stations 16a and 16b and the brace stored sensor of the third dock station 16c, and (2) inputs from the brace operative sensors 58a and 58b of the dock stations 16a and 16b and the brace operative sensor of the third dock station 16c of FIGS. 1A-1B. In the illustrated example of FIG. 16A, the example logic table 1600 includes Boolean values to represent the status of the example inputs A-D and the example outputs $Z_1$ and $\overline{Z_1}$. In the illustrated example, the output $Z_1$ represents the second warning alert corresponding to the warning signal 22b of the second alert device 20b of the second dock station 16b and the output $\overline{Z_1}$ represents the green light 68 of the second alert device 20b.

FIG. 16B depicts an example truth table 1610 based on the example logic table 1600 of FIG. 16A. The example truth table 1610 includes the example inputs of the example logic table 1600 designated by A-F. In the illustrated example of FIG. 16B, the values in the A column correspond to the logic values of the first braced stored sensor of the example logic table 1400 of FIG. 14A. Further, the values in the B-F columns correspond to the logic values of the first brace operative sensor, the second brace stored sensor, the second brace operative sensor, the third brace stored sensor, and the third brace operative sensor of the example logic table 1600 of FIG. 16A, respectively. Further depicted in FIG. 16B, the example truth table 1610 includes example outputs designated by $Z_1$ and $\overline{Z_1}$. In the illustrated example of FIG. 16B, the values in the $Z_1$ correspond to the logic values of the second warning alert output of the example logic table 1600 of FIG. 16A. Further, the values in the $\overline{Z_1}$ column correspond to the logic values of the second green safe light output of the example logic table 1600 of FIG. 16A.

FIG. 16C is a schematic illustration of an example control circuit 1620 implemented using example logic gates corresponding to the example truth table 1610 of FIG. 16B. For example, using truth table conversion methods such as generating and processing Karnaugh maps, performing Boolean algebra, etc., an example Boolean expression as described below in Equation (3) may be generated to represent the truth table of FIG. 16B $$Z_1 = \overline{C} + D + \overline{AB} + \overline{EF}$$ Equation (3):

Alternatively, other Boolean expressions may be generated based on the truth table of FIG. 16B. In the illustrated example of Equation (3) above, the output $Z_1$ corresponds to the second warning alert output depicted in FIGS. 16A-B, which represents the status of the warning signal 22b of the second alert device 20b of the second dock station 16b.

At least some of the aforementioned examples include one or more features and/or benefits including, but not limited to, the following:

In some examples, a monitoring and alerting system includes a first sensor system to monitor a location of a first brace of a first dock station of the loading dock. The first brace being positionable in a first stored position, a first operative position, and a first transition position. The first transition position is between the first stored position and the first operative position. A second sensor system to monitor a location of a second brace of a second dock station of the loading dock adjacent the first dock station. The second brace being positionable in a second stored position, a second operative position, and a second transition position. The second transition position is between the second stored position and the second operative position. A first signaling device at the first dock station is responsive to outputs of the first sensor system and the second sensor system and a second signaling device at the second dock station is responsive to outputs of the first sensor system and the second sensor system.

In some examples, the first signaling device is to emit a first warning signal at the first dock station when the second brace of the second dock station is in the second transition position.

In some examples, the first signaling device is to emit a first non-alert signal when the first brace is in the first stored position and the second brace is in either the second stored position or the second operative position.

In some examples, the second signaling device is to emit a second warning signal when the first brace is in the first transition position.

In some examples, a controller is to command the first signaling device and the second signaling device, the controller to receive inputs from the first sensor system and the second sensor system.

In some examples, the first sensor system includes a first brace stored position sensor and a first brace operative position sensor, the first brace stored position sensor to provide a first output signal in response to the first brace being in the stored position, and the first brace operative position sensor to provide a second output signal in response to the first brace being in the operative position.

In some examples, a controller is to determine that the first brace is in the first transition position when the first brace stored position sensor does not emit the first output signal and the first brace operative position sensor does not emit the second output signal In some examples, the second sensor system includes a second brace stored position sensor and a second brace operative position sensor, the second brace stored position sensor to provide a first output signal in response to the second brace being in the stored position, and the second brace operative position sensor to provide a second output signal in response to the second brace being in the operative position In some examples, a tangible computer-readable medium includes instructions that, when executed cause a machine to at least: determine a first brace position of a first brace at a first dock station, the first brace position being one of a first stored position, a first operative position or a first transition position; determine a second brace position of a second brace at a second dock station adjacent the first dock station, the second brace position being one of a second stored position, a second operative position or a second transition position; and command a first alert device at the first dock station based on the determined first brace position and the second brace position.

In some examples, the instructions, when executed, cause the machine to command a second alert device at the second dock station based on the first brace position and the second brace position.

In some examples, the instructions, when executed, cause the machine to command the first alert device to emit a first alert at the first dock station in response to determining that the second brace position is the second transition position.

In some examples, the instructions, when executed, cause the machine to command the first alert device to emit a second alert different than the first alert when (1) the first brace position is the first operative position, and (2) the second brace position is either the second stored position or the second operative position.

In some examples, the instructions, when executed, cause the machine to command the first alert device to emit a first alert at the first dock station when the first brace position is the first transition position.

In some examples, the instructions, that, when executed, cause the machine is to access a first stored position signal from a first brace stored position sensor associated with the first brace, a first operative position signal from a first brace operative sensor associated with the first brace, a second brace stored position signal from a second brace stored position sensor associated with the second brace, and a second operative position signal from a second brace operative position sensor associated with the second brace.

In some examples, the instructions, when executed, cause the machine to determine the first brace position based on the first stored position feedback signal and the first operative position feedback signal.

In some examples, the instructions, when executed, cause the machine to determine that the first brace position is the second transition position in response to determining that the first brace position is neither the first stored position nor the first operative position.

In some examples, the instructions, when executed, cause the machine to determine the second brace position based on the second stored position signal and the second operative position signal.

In some examples, the instructions, when executed, cause the machine to determine that the second brace position is in the transition position in response to determining that the second brace position is neither the second stored position nor the second operative position.

In some examples, a system for use at a loading dock includes first means for sensing a first brace position of a first brace at a first dock station, the first brace position being one of a first stored position, a first operative position or a first transition position; second means for sensing a second brace position of a second brace at a second dock station adjacent the first dock station, the second brace position being one of a second stored position, a second operative position or a second transition position; and means for controlling a first alert device located at the first dock station based on the first brace position and the second brace position.

In some examples, the means for controlling is to command a second alert device located at the second dock station based on the first brace position and the second brace position.

In some examples, the means for controlling the first alert device is to cause the first alert device to emit a first alert at the first dock station when the second brace position is the second transition position.

In some examples, the means for controlling the first alert device is to cause the first alert device to emit a second alert at the first dock station different than the first alert when: (1) the first brace position is the first operative position; and (2) the second brace position is either the second stored position or the second operative position.

In some examples, the means for controlling the first alert device is to cause the first alert device to emit a first alert at the first dock station when the first brace position of the first dock station is the transition position.

In some examples, the means for controlling includes means for determining a position of the first brace based on at least one of a first stored position signal and a first operative position signal from the first means for sensing.

In some examples, the means for determining the first brace position is to determine that the first brace position is the first transition position in response to the first means for sensing providing neither the first stored position signal nor the first operative position signal.

In some examples, the means for controlling includes means for determining a position of the second brace position based on at least one of a second stored position signal or a second operative position signal from the second means for sensing.

In some examples, the means for determining the second brace position is to determine that the second brace position is the second transition position in response to second means for sensing providing neither the stored position signal nor the operative position signal.

In some examples, a method includes: determining, with a logic circuit, a first brace position of a first brace at a first dock station, the first brace position being at least one of a first stored position, a first operative position or a first transition position; determining, with the logic circuit, a second brace position of a second brace at a second dock station adjacent the first dock station, the second brace position being at least one of a second stored position, a second operative position or a second transition position; and controlling, with the logic circuit, a first alert device located at the first dock station based on the determined first brace position and the second brace position.

In some examples, the method includes controlling a second alert device located at the second dock station based on the determined first brace position and the second brace position.

In some examples, the method includes controlling the first alert device to emit a first alert at the first dock station in response to determining that the second brace position is the second transition position.

In some examples, the method includes controlling the first alert device to emit a second alert at the first dock station different than the first alert in response to determining that: (1) the first brace position is the first operative position; and (2) the second brace position is either the second stored position or the second operative position In some examples, the method includes controlling the first alert device to emit a first alert at the first dock station when the first brace position is neither the first stored position nor the first operative position.

In some examples, the method includes determining of the first brace position is based on a first stored position signal from a first stored sensor and a first operative position signal from a first operative sensor.

In some examples, the method includes determining the first brace position is the first transition position when the first brace position is neither the stored position nor the operative position.

In some examples, the determining of the second brace position is based on a second stored position signal from a second stored sensor and a second operative position signal from a second operative sensor.

In some examples, the method includes determining the second brace position is the second transition position when the second brace is neither the second stored position nor the second operative position.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A monitoring and alerting system, the system comprising:
   a first sensor system to monitor a location of a first brace of a first dock station of a loading dock, the first brace being positionable in a first stored position, a first operative position, and a first transition position, the first transition position between the first stored position and the first operative position;
   a second sensor system to monitor a location of a second brace of a second dock station of the loading dock adjacent the first dock station, the second brace being positionable in a second stored position, a second operative position, and a second transition position, the second transition position between the second stored position and the second operative position;
   a first signaling device at the first dock station responsive to outputs of the first sensor system and the second sensor system; and
   a second signaling device at the second dock station responsive to outputs of the first sensor system and the second sensor system.

2. The system as defined in claim 1, wherein the first signaling device is to emit a first warning signal at the first dock station when the second brace of the second dock station is in the second transition position.

3. The system as defined in claim 1, wherein the first signaling device is to emit a first non-alert signal when the first brace is in the first stored position and the second brace is in either the second stored position or the second operative position.

4. The system as defined in claim 1, wherein the second signaling device is to emit a second warning signal when the first brace is in the first transition position.

5. The system as defined in claim 1, further including a controller to command the first signaling device and the second signaling device, the controller to receive inputs from the first sensor system and the second sensor system.

6. The system as defined in claim 5, wherein the first sensor system includes a first brace stored position sensor and a first brace operative position sensor, the first brace stored position sensor to provide a first output signal in response to the first brace being in the stored position, and the first brace operative position sensor to provide a second output signal in response to the first brace being in the operative position.

7. The system as defined in claim 6, wherein the controller is to determine that the first brace is in the first transition position when the first brace stored position sensor does not emit the first output signal and the first brace operative position sensor does not emit the second output signal.

8. The system as defined in claim 5, wherein the second sensor system includes a second brace stored position sensor and a second brace operative position sensor, the second brace stored position sensor to provide a first output signal in response to the second brace being in the stored position, and the second brace operative position sensor to provide a second output signal in response to the second brace being in the operative position.

9. A tangible computer-readable medium comprising instructions that, when executed, cause a machine to at least:
   determine a first brace position of a first brace at a first dock station, the first brace position being one of a first stored position, a first operative position or a first transition position;
   determine a second brace position of a second brace at a second dock station adjacent the first dock station, the second brace position being one of a second stored position, a second operative position or a second transition position; and command a first alert device at the first dock station based on the determined first brace position and the second brace position, and a second alert device at the second dock station based on the first brace position and the second brace position.

10. The computer-readable medium as defined in claim 9, wherein the instructions, when executed, cause the machine to command the first alert device to emit a first alert at the first dock station in response to determining that the second brace position is the second transition position.

11. The computer-readable medium as defined in claim 10, wherein the instructions, when executed, cause the machine to command the first alert device to emit a second alert different than the first alert when (1) the first brace position is the first operative position, and (2) the second brace position is either the second stored position or the second operative position.

12. The computer-readable medium as defined in claim 9, wherein the instructions, when executed, cause the machine to command the first alert device to emit a first alert at the first dock station when the first brace position is the first transition position.

13. The computer-readable medium as defined in claim 9, wherein the instructions, that, when executed, cause the machine to access a first stored position signal from a first brace stored position sensor associated with the first brace, a first operative position signal from a first brace operative sensor associated with the first brace, a second brace stored position signal from a second brace stored position sensor associated with the second brace, and a second operative position signal from a second brace operative position sensor associated with the second brace.

14. The computer-readable medium as defined in claim 13, wherein the instructions, when executed, cause the machine to determine the first brace position based on the first stored position signal and the first operative position signal.

15. The computer-readable medium as defined in claim 14, wherein the instructions, when executed, cause the machine to determine that the first brace position is the second transition position in response to determining that the first brace position is neither the first stored position nor the first operative position.

16. The computer-readable medium as defined in claim 13, wherein the instructions, when executed, cause the machine to determine the second brace position based on the second stored position signal and the second operative position signal.

17. The computer-readable medium as defined in claim 16, wherein the instructions, when executed, cause the machine to determine that the second brace position is in the transition position in response to determining that the second brace position is neither the second stored position nor the second operative position.

18. A system for use with a vehicle at a loading dock, the system comprising:

first means for sensing a first brace position of a first brace at a first dock station, the first brace position being one of a first stored position, a first operative position or a first transition position;

second means for sensing a second brace position of a second brace at a second dock station adjacent the first dock station, the second brace position being one of a second stored position, a second operative position or a second transition position; and means for controlling a first alert device located at the first dock station based on the first brace position and the second brace position and a second alert device located at the second dock station based on the first brace position and the second brace position.

19. The system as defined in claim 18, wherein the means for controlling the first alert device is to cause the first alert device to emit a first alert at the first dock station when the second brace position is the second transition position.

20. The system as defined in claim 19, wherein the means for controlling the first alert device is to cause the first alert device to emit a second alert at the first dock station different than the first alert when: (1) the first brace position is the first operative position; and (2) the second brace position is either the second stored position or the second operative position.

21. The system as defined in claim 18, wherein the means for controlling the first alert device is to cause the first alert device to emit a first alert at the first dock station when the first brace position of the first dock station is the transition position.

22. The system as defined in claim 18, wherein the means for controlling includes means for determining a position of the first brace based on at least one of a first stored position signal and a first operative position signal from the first means for sensing.

23. The system as defined in claim 22, wherein the means for determining the first brace position is to determine that the first brace position is the first transition position in response to the first means for sensing providing neither the first stored position signal nor the first operative position signal.

24. The system as defined in claim 22, wherein the means for controlling includes means for determining a position of the second brace position based on at least one of a second stored position signal or a second operative position signal from the second means for sensing.

25. The system as defined in claim 24, wherein the means for determining the second brace position is to determine that the second brace position is the second transition position in response to second means for sensing providing neither the stored position signal nor the operative position signal.

* * * * *